United States Patent
Kim et al.

(10) Patent No.: US 10,396,364 B2
(45) Date of Patent: *Aug. 27, 2019

(54) ELECTRODE, METHOD OF FABRICATING THE SAME, AND BATTERY USING THE SAME

(71) Applicant: JENAX INC., Busan (KR)

(72) Inventors: Chang Hyeon Kim, Chungcheongnam-do (KR); Min Gyu Choi, Sejong (KR); Lee Hyun Shin, Busan (KR)

(73) Assignee: Jenax Inc., Busan (KR)

( * ) Notice: Subject to any disclaimer, the term of this patent is extended or adjusted under 35 U.S.C. 154(b) by 380 days.

This patent is subject to a terminal disclaimer.

(21) Appl. No.: 14/782,312

(22) PCT Filed: Jun. 9, 2014

(86) PCT No.: PCT/KR2014/005051
§ 371 (c)(1),
(2) Date: Oct. 2, 2015

(87) PCT Pub. No.: WO2014/196843
PCT Pub. Date: Dec. 11, 2014

(65) Prior Publication Data
US 2016/0111729 A1    Apr. 21, 2016

(30) Foreign Application Priority Data
Jun. 7, 2013 (KR) .................. 10-2013-0065544

(51) Int. Cl.
*H01M 4/72* (2006.01)
*H01M 4/64* (2006.01)
(Continued)

(52) U.S. Cl.
CPC .......... *H01M 4/72* (2013.01); *H01M 4/0416* (2013.01); *H01M 4/0435* (2013.01);
(Continued)

(58) Field of Classification Search
CPC .......... H01M 4/72; H01M 4/75; H01M 4/525; H01M 4/505; H01M 4/0435; H01M 4/131;
(Continued)

(56) References Cited

U.S. PATENT DOCUMENTS 2,636,916 A * 4/1953 Licharz ................. B21C 23/007
429/234
2,794,845 A * 6/1957 Grabe .................. B21C 23/007
205/57
(Continued)

FOREIGN PATENT DOCUMENTS

JP        2010-218849      9/2010
KR    10-1999-0048391      7/1999
(Continued)

OTHER PUBLICATIONS

International Search Report dated Sep. 30, 2014 for PCT/KR2014/005051.
(Continued)

*Primary Examiner* — Michael L Dignan
(74) *Attorney, Agent, or Firm* — Jones Day

(57) ABSTRACT

Provided are a non-woven fabric current collector and a method and system of fabricating a battery using the same. An electrode according to an embodiment of the present invention includes a non-woven fabric current collector including a conductive non-woven fabric sheet including a network of conductive fibers and pores for communication between a main surface and the interior thereof; and con-
(Continued)

ductive patterns partially blocking the pores on the main surface of the conductive non-woven fabric sheet.

13 Claims, 12 Drawing Sheets

(51) Int. Cl.
| | |
|---|---|
| *H01M 4/04* | (2006.01) |
| *H01M 4/131* | (2010.01) |
| *H01M 4/1391* | (2010.01) |
| *H01M 4/505* | (2010.01) |
| *H01M 4/525* | (2010.01) |
| *H01M 4/66* | (2006.01) |
| *H01M 10/0525* | (2010.01) |
| *H01M 4/75* | (2006.01) |
| *H01M 4/02* | (2006.01) |

(52) U.S. Cl.
CPC ......... *H01M 4/131* (2013.01); *H01M 4/1391* (2013.01); *H01M 4/505* (2013.01); *H01M 4/525* (2013.01); *H01M 4/64* (2013.01); *H01M 4/667* (2013.01); *H01M 4/75* (2013.01); *H01M 10/0525* (2013.01); *H01M 2004/028* (2013.01); *H01M 2220/10* (2013.01); *H01M 2220/20* (2013.01); *H01M 2220/30* (2013.01)

(58) Field of Classification Search
CPC ........... H01M 4/1391; H01M 10/0525; H01M 4/0416; H01M 4/667; H01M 4/64; H01M 2004/028; H01M 2220/10; H01M 2220/20; H01M 2220/30; H01M 4/663; H01M 4/668; H01M 4/70; H01M 4/74; H01M 4/806

See application file for complete search history.

(56) References Cited

U.S. PATENT DOCUMENTS

| | | | | |
|---|---|---|---|---|
| 5,589,301 A | * | 12/1996 | Edgington | H01M 4/80 429/234 |
| 5,677,084 A | * | 10/1997 | Tsukamoto | D01F 11/14 423/447.1 |
| 5,750,289 A | * | 5/1998 | Kejha | H01M 4/382 429/233 |
| 6,117,802 A | * | 9/2000 | Rohrbach | D01D 5/24 428/372 |
| 9,935,316 B2 | * | 4/2018 | Kim | H01M 4/667 |
| 2001/0031402 A1 | * | 10/2001 | Imai | H01M 2/145 429/234 |
| 2005/0100791 A1 | * | 5/2005 | Gyenge | C25D 3/56 429/236 |
| 2009/0311587 A1 | * | 12/2009 | Best | H01M 4/74 429/127 |
| 2011/0311876 A1 | * | 12/2011 | Sturgeon | H01M 4/663 429/232 |
| 2013/0216849 A1 | * | 8/2013 | Matsunaga | C25D 1/04 428/566 |

FOREIGN PATENT DOCUMENTS

| | | |
|---|---|---|
| KR | 10-2008-0015162 | 2/2008 |
| KR | 10-0813829 | 3/2008 |
| KR | 10-1088073 | 12/2011 |
| KR | 10-1174990 | 8/2012 |

OTHER PUBLICATIONS

Written Opinion of the International Search Report dated Sep. 30, 2014 for PCT/KR2014/005051.

* cited by examiner

ELECTRODE, METHOD OF FABRICATING THE SAME, AND BATTERY USING THE SAME

This application claims the priority of Korean Patent Application No. 10-2013-0065544, filed on Jun. 7, 2013 in the KIPO (Korean Intellectual Property Office), the disclosure of which is incorporated herein entirely by reference. Further, this application is the National Stage application of International Application No. PCT/KR2014/005051, filed Jun. 9, 2014, which designates the United States and was published in Korean. Each of these applications is hereby incorporated by reference in their entirety into the present application.

TECHNICAL FIELD

The present invention relates to a battery technology, and more particularly, to a non-woven fabric current collector, a method of fabricating a battery using the same, and a system for fabricating the same.

BACKGROUND ART

Along with the dramatic developments in semiconductor fabrication technologies and communication technologies during the last 20 years, researches and commercialization have been widely performed on lithium-ion batteries as power supplies for portable electronic devices, such as mobile communication terminals and laptop computers. Recently, to handle environmental problems including energy exhaustion and the greenhouse effect, demands for energy saving technologies are rapidly increasing. As a result, researches are actively performed on medium and large size batteries applicable not only to industries related to portable electronic devices, but also to electronic vehicles, hybrid vehicles, or power grids. As batteries for the purpose, nickel-metal hydride (Ni-MH) batteries and lithium secondary batteries are mainly researched. Here, since a lithium secondary battery utilizes lithium, which is the lightest metal with the lowest standard reduction potential from among known metals in nature, a battery with high energy density, high voltage, and high power output may be fabricated.

To embody such performance of a battery, it is important to develop a suitable current collector. It is necessary to enhance internal resistance and irreversibility of a current collector to improve performance of a battery. At the same time, it is necessary to secure high yield for economic feasibility of fabricating the current collector.

DISCLOSURE OF THE INVENTION

Technical Problem

The present invention provides a current collector that exhibits high energy density, excellent charging/discharging efficiency, excellent charging/discharging rate, and excellent cycle characteristics with high yield for economic feasibility of fabricating the same.

The present invention also provides a method of fabricating a battery with reproducibility and reliability by using a non-woven fabric current collector having the above-stated advantages.

The present invention also provides a system for fabricating a battery having the above-stated advantages.

Technical Solution

According to an aspect of the present invention, there is provided an electrode including a conductive non-woven fabric sheet including a network of conductive fibers and pores for communication between a main surface and the interior thereof; and conductive patterns partially blocking the pores on the main surface of the conductive non-woven fabric sheet. A non-woven fabric current collector having formed thereon the conductive patterns for partially blocking the pores is provided on the main surfaces of the conductive non-woven fabric sheet.

According to some embodiments, the conductive patterns may be arranged at portions of an electrode package structure at which stresses are concentrated. Furthermore, the conductive patterns may be parallel to a direction in which the non-woven fabric current collector is transferred for forming an electrode.

According to some embodiments, the conductive patterns may include linear patterns that are apart from one another at a certain interval. In this case, the linear patterns extend across the main surface of the conductive non-woven fabric sheet to be parallel to a winding, folding, or bending axis of the electrode package structure. Furthermore, the conductive patterns may extend onto edges of the conductive non-woven fabric sheet.

According to another aspect of the present invention, there is provided a method of fabricating an electrode, the method including providing the above-stated non-woven fabric current collector; impregnating an electrically active material into the non-woven fabric current collector by passing the non-woven fabric current collector through a bath filled with slurries containing a precursor of the electrically active material or a dispersing solvent thereof; drying the non-woven fabric current collector pulled out of the bath; and pressing the non-woven fabric current collector having impregnated thereto the electrically active material.

The impregnating of the electrically active material may be performed by passing the non-woven fabric current collector through a gap between processing rollers arranged inside the bath. According to some embodiments, the surfaces of the processing rollers may include surface patterns including convex portions and concave portions.

According to some embodiments, surplus electrically active material on the surfaces of the non-woven fabric current collector pulled out of the bath may be swept before the drying of the dispersing solvent. Furthermore, an operation for controlling an impregnated amount of the electrically active material by pressing surfaces of the non-woven fabric current collector pulled out of the bath may be performed before the drying of the dispersing solvent.

According to some embodiments, an operation for combining battery tabs or leads onto at least some of the conductive patterns of the non-woven fabric current collector may be further performed. The conductive patterns are arranged at portions of an electrode package structure at which stresses are concentrated. Furthermore, the conductive patterns may be parallel to a direction in which the non-woven fabric current collector is transferred for forming an electrode. According to some embodiments, the conductive patterns may include linear patterns that are apart from one another at a certain interval.

According to another aspect of the present invention, there is provided a secondary battery including a negative electrode, a positive electrode, and a separator arranged between the negative electrode and the positive electrode, wherein at least one of the negative electrode and the positive electrode may include the above-stated non-woven fabric current collector. According to some embodiments, the conductive patterns may be arranged at portions of an electrode package structure at which stresses are concentrated.

Advantageous Effects

According to an embodiment of the present invention, by employing a conductive non-woven fabric sheet including a network of conductive fibers, energy density of a battery may be improved as effects of reduced internal resistance and increased interface based on excellent electric characteristics and flexibility and systemic strength of fibers. Furthermore, a battery with improved charging/discharging speed, charging/discharging efficiency, and cycle characteristics may be obtained. Furthermore, since conductive patterns are formed on the conductive non-woven fabric sheet, mechanical tensile strength is improved, thereby preventing increase of internal resistance based on possible deformation of a non-woven fabric current collector that may occur during continuous operations using a winding device or a battery packaging operation, such as a jelly roll forming operation, and improving a productivity by resolving defects based on yields and enabling easy formation of battery tabs or leads.

According to another embodiment of the present invention, a method of fabricating a battery using a non-woven fabric current collector having the above-stated advantages may be provided.

According to another embodiment of the present invention, a system for fabricating a battery by using a non-woven fabric current collector having the above-stated advantages may be provided.

MODE FOR CARRYING OUT THE INVENTION

Figure 1A:
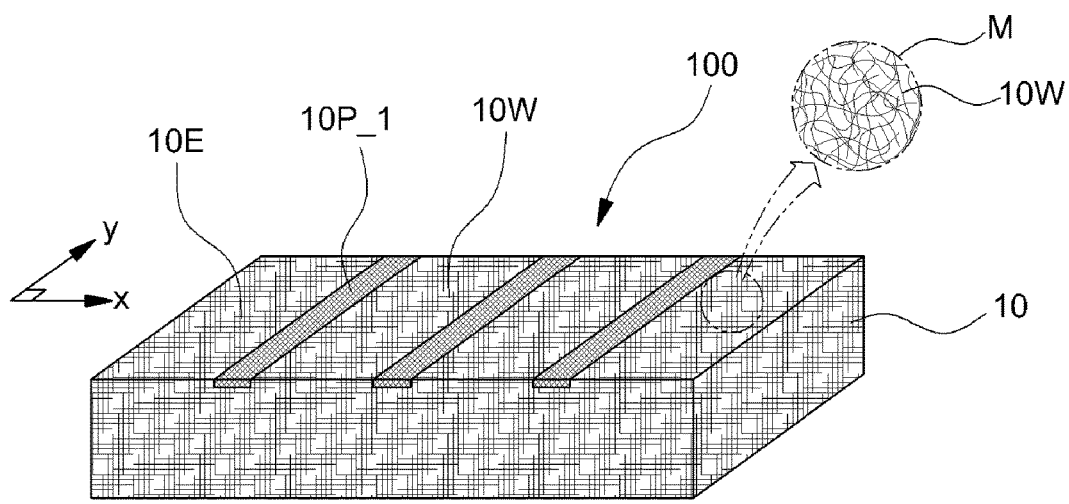
FIG. 1A is perspective view of a non-woven fabric current collector according to an embodiment of the present invention.

Hereinafter, exemplary embodiments will be described in detail with reference to accompanying drawings.

The invention may, however, be embodied in many different forms and should not be construed as being limited to the embodiments set forth herein; rather, these embodiments are provided so that this disclosure will be thorough and complete, and will fully convey the concept of the invention to those skilled in the art.

Furthermore, in the drawings, the thicknesses of layers and regions are exaggerated for clarity, and like reference numerals in the drawings denote like elements. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although numerical terms (e.g., "first" and "second") are used herein to describe various members, parts, regions, layers and/or sections, these members, parts, regions, layers and/or sections are not to be limited by these terms. These terms are only used to distinguish one member, part, region, layer or section from another member, part, region, layer or section. Thus, for example, a first member, part, region, layer or section discussed below could be termed a second, part, region, layer or section without departing from the teachings of the illustrated embodiments.

Figure 1B:
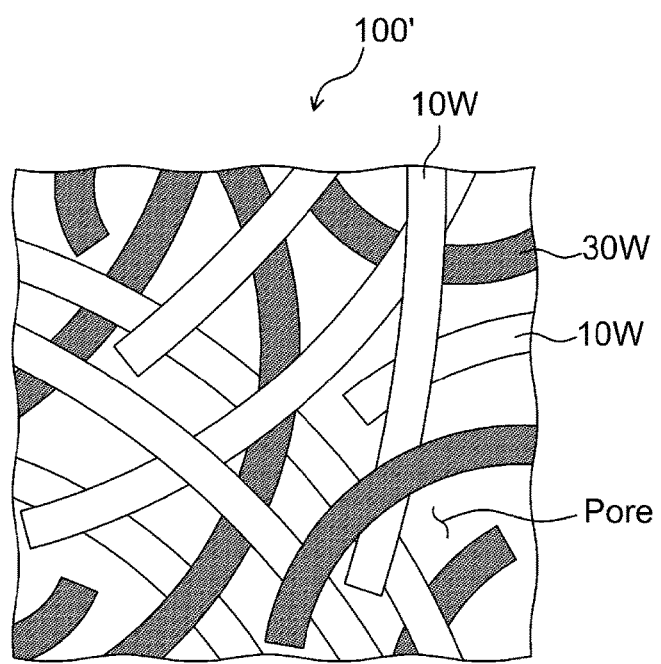
FIG. 1B is a partial view of a non-woven fabric current collector according to another embodiment of the present invention.
Figure 1C:
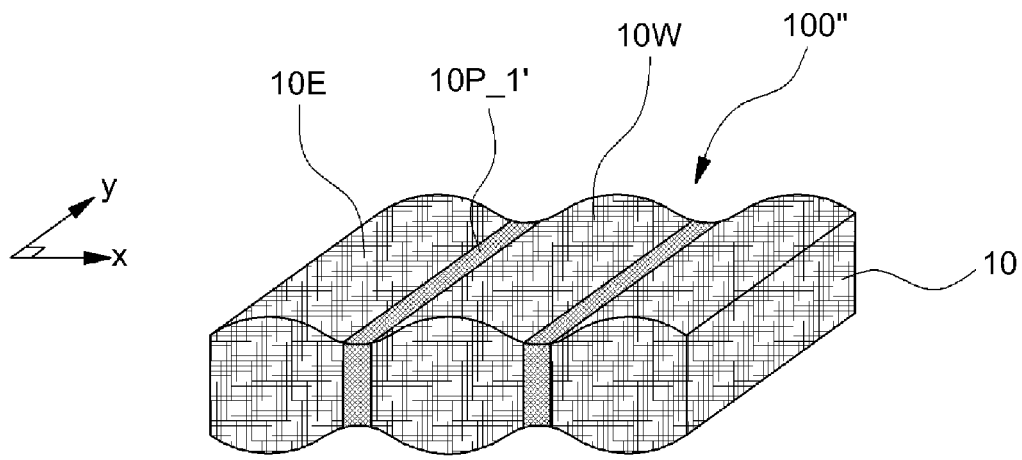
FIG. 1C is a perspective view of a non-woven fabric current collector according to another embodiment of the present invention.

FIG. 1A is perspective view of a non-woven fabric current collector 100 according to an embodiment of the present invention, FIG. 1B is a partial view of a non-woven fabric current collector 100' according to another embodiment of the present invention, and FIG. 1C is a perspective view of a non-woven fabric current collector 100" according to another embodiment of the present invention.

Referring to FIG. 1A, the non-woven fabric current collector 100 includes a conductive non-woven fabric sheet 10. The conductive non-woven fabric sheet 10 may include conductive fibers 10W as shown in the partially magnified view M. The conductive fibers 10W functions as a path for transferring electrons and, unlike a 2-dimensional metal current collecting foil in the related art, the conductive non-woven fabric sheet 10 may be used as a current collector including a 3-dimensional conductive network. Since the conductive non-woven fabric sheet 10 functions as a current collector, the conductive non-woven fabric sheet 10 may replace a metal current collecting foil in the related art.

The conductive fibers 10W have a non-woven fabric structure in which the conductive fibers 10W are randomly tangled with one another. As shown in the partially magnified view M, the plurality of conductive fibers 10W have irregularly curved shapes and are electrically connected to one another via physical contacts, thereby forming a conductive network for a current flow throughout the entire volume. Since the conductive network is formed as the conductive fibers 10W are curved or bent and are tangled with one another, contact one another, and are combined with one another, the conductive network may be moved with pores therein, thus being highly adaptive to change of volume of an electrically active material to be charged into the conductive network. Furthermore, due to fabric characteristics, the conductive network may be flexible. Since an electrolyte may be easily introduced via the pores and mobility of positive ions for chemical reactions of a battery, such as lithium ions, is improved, charging/discharging efficiency may be improved.

The plurality of conductive fibers 10W are metal filaments, carbon fibers, conductive polymer fibers, polymer fibers coated with a metal layer or a conductive polymer layer (e.g., polyolefin fibers coated with a metal), or hollow metal fibers (e.g., fibers formed by forming sacrificing cores using carbon fibers or polymer fibers, coating a metal layer on the sacrificing cores, and removing the sacrificing cores by oxidizing or combusting the sacrificing cores to remain the metal layer) and, preferably, are metal filaments.

According to some embodiments, a metal layer or a conductive polymer layer may be further formed on the conductive fibers 10W to reduce contact resistance and improve bonding force between the conductive fibers 10W. For example, a conductive polymer layer or a metal layer may be coated on conductive fibers formed of carbon fibers or metal filaments. Furthermore, a suitable reactive interface layer or a buffer layer for improving bonding force therebetween may be formed between the metal layer or the conductive polymer layer and surfaces of the plurality of conductive fibers 10W.

The metal filaments may be fibrous bodies containing copper, titanium, a stainless steel, nickel, platinum, gold, tantalum, niobium, hafnium, zirconium, vanadium, indium, cobalt, tungsten, tin, zinc, beryllium, molybdenum, an alloy thereof, the electrically active material, or a solid solution thereof, For example, aluminum filaments may be used for a positive electrode, whereas copper or nickel filaments may be used for a negative electrode. According to another embodiment of the present invention, the above-stated materials may have stacked structures in which the above-stated metals are sequentially stacked, may include layers partially oxidized via heat treatments, or may include interlayer compounds. Furthermore, metal filaments may be formed of different types of metals, and thus the conductive non-woven fabric sheet 10 may be provided by different types of metal filaments.

The metal filaments may have thicknesses from about 1 µm to about 200 µm. If thicknesses of the metal filaments are below 1 µm, it is difficult to form filaments with uniform material properties, e.g., uniform resistance, and it is difficult to coat an electrically active material thereon. Furthermore, if thicknesses of the metal filaments exceed 200 µm, surface area per volume of the metal filaments decreases. Therefore, it is difficult to obtain improved battery performance based on increased surface area, and energy density is reduced. Furthermore, as the effect for restraining an electrically active material impregnated into the non-woven fabric current collector 100 is deteriorated, the electrically active material may be peeled off from conductive filaments during repeated charging and discharging operations, and thus cycle characteristics of a battery may be deteriorated.

According to some embodiments, a metal filament may preferably have a thickness from about 2 µm to about 20 µm. When it is changed to a surface area to volume ratio per unit length (e.g., if a metal filament has a circular cross-section, 4/diameter), the surface area to volume ratio is from about $4 \times 10^5$ (1/m) to about $2 \times 10^6$ (1/m). Generally, a conventional current collector employing a metal foil has a thickness of about 20 µm. Metal filaments having thicknesses from about 2 µm to about 20 µm have a surface area that is from about four times to about forty times greater than that of the conventional current collector employing a metal foil. A surface area of a current collector refers to a surface area of a conductive network per volume of an electrode regarding the conductive fibers 10W forming reactive interfaces respectively against an electrically active material and an electrolyte. Therefore, a battery with significantly increased energy density may be obtained by maximizing the surface area of the current collector.

According to some embodiments, an average length of metal filaments may be from about 5 mm to about 1000 mm. In this case, an average aspect ratio of the metal filaments is from about 25 to about $10^6$. If necessary, the metal filaments may be segmented to have lengths from about 5 cm to about 8 cm and form a non-woven fabric structure.

According to another embodiment, metal filaments constituting a conductive network may have one or more of length or thickness different from one another. For example, a non-woven fabric current collector may be formed by mixing long filaments and short filaments. A ratio of length of a short filament to a long filament may be from about 1% to about 50%. Long filaments may determine overall conductivity and mechanical strength of a non-woven fabric current collector, whereas short filaments may determine internal resistance of a battery by improving electron transferring paths between an electrically active material and the long filaments or electrical connections between the long filaments.

The metal filament feature properties of metals, that is, excellent heat-resistance, plasticity, and electric conductivity compared to those of other materials and may be used in fabric fabricating operations, such as a non-woven fabric processing operation. Therefore, such material advantages may be maintained throughout the metal filaments having lengths substantially equal to or greater than 5 mm, and thus, compared to other materials, such as polymer fibers coated with a conductive material, an operational burden for a bridging operation or a thermal operation may be relatively small and a fabricating process window may be relatively wide.

According to some embodiments, a conductive material may be coated onto the plurality of conductive fibers 10W. The conductive material may be pre-coated onto the plurality of conductive fibers 10W. Alternatively, the conductive material may be post-coated onto the plurality of conductive fibers 10W by using a suitable dispersing solvent in a follow-up operation thereafter. The conductive material may be carbon black, acetylene black, ketjen black, fine carbon like superfine graphite particles, a nano metal particle paste, an indium tin oxide (ITO) paste, carbon nanotubes, or other nano structures with large specific surface areas and low resistances. However, the present invention is not limited thereto. In an electrode employing the non-woven fabric current collector 100, the conductive material prevents increase of internal resistance and lifespan deterioration of a battery that may occur when an electrically active material is peeled off from the conductive fibers 10W or physical contact between the conductive fibers 10W is weakened based on volume change caused by charging and discharging of the battery.

According to some embodiments, a binder may be pre-coated or post-coated on the plurality of conductive fibers 10W, together with the conductive material, to fix the conductive material on the plurality of conductive fibers 10W. The binder not only fixes the conductive material onto the plurality of conductive fibers 10W, but also fixes the plurality of conductive fibers 10W to one another or fixes an impregnated electrically active material. For example, the binder may be a polymer binder, such as polyvinylidenefluoride (PVdF), styrenebutadiene rubber (SBR), polyimide, a polyurethane-based polymer, a polyester-based polymer, and an ethylene-propylenediene copolymer (EPDM).

Referring to FIG. 1B, a non-woven fabric current collector 100' including a conductive non-woven fabric sheet according to another embodiment of the present invention may further include fiberized linear binders 30W dispersed with the conductive fibers 10W. The linear binders 30W may contain a polymer material advantageous for fiberization. For example, the linear binders 30W may contain polyethylene (PE), polypropylene (PP), polyethylene terephthalate (PET), polypropylene terephthalate (PPT), polyacrylonitryl (PAN), nylon, polyethylene naphthalate (PEN), polyether sulfone (PES), polyether etherketone (PEEK), polyphenylene sulfide (PPS), polyvinyliden fluoride (PVDF), a copolymer thereof, a derivative thereof, or a mixture thereof. However, the above-stated materials are merely examples, and the present invention is not limited thereto. The linear binders 30W may contain a functional polymer material with suitable mechanical properties or a heat-resistance, such as highly strong, highly elastic, and magnetic contractive fiber. In terms of fabricating, after the linear binders 30W are randomly mixed with the conductive fibers 10W, a non-woven fabric structure may be obtained via a bridging operation or a combination structure of the linear binders 30W and the conductive fibers 10W may be obtained via a fiber blending operation.

Electrically active materials (not shown) may be impregnated into the non-woven fabric current collectors 100 and 100' shown in FIGS. 1A and 1B via the pores in the form of slurries or powders or may be coated onto the conductive fibers 10W. According to another embodiment of the present invention, the conductive fibers 10W may be formed of an electrically active material, and thus the conductive fibers 10W may function as an electrically active material. Selectively, an electrically active material may be pre-coated onto the conductive fibers or an electrically active material may be additionally impregnated via pores of conductive fibers formed of an electrically active material.

For example, in case of a positive electrode, the electrically active material may be a material from among $LiNiO_2$, $LiCoO_2$, $LiMnO_2$, $LiFePO_4$, and $LiV_2O_5$, where the materials may be charged into a conductive non-woven fabric sheet in the above-stated regard. However, the above-stated materials are merely examples, and the present invention is not limited thereto. For example, an electrically active material for a positive electrode may be selected from among oxides, phosphates, sulfides, and fluoride having two or more components including lithium, nickel, cobalt, chromium, magnesium, strontium, vanadium, lanthanum, cerium, iron, cadmium, lead, titanium, molybdenum, or manganese or a combination thereof. For example, an electrically active material for a positive electrode may be ternary or more component compound, such as $Li[Ni, Mn, Co]O_2$.

In case of a negative electrode, the electrically active material may contain a carbon material (a low crystalline carbon like soft carbon or hard carbon/a high crystalline carbon including a high temperature pyrolytic carbon, such as natural graphite, Kish graphite, pyrolytic carbon, mesophase pitch based carbon fibers, meso-carbon microbeads, mesophase pitches, and petroleum or coal tar pitch derived cokes)/ketjen black/acetylene black/metal lithium/silicon (Si) or a Si-based compound, such as a silicon oxide/tin (Sn), an alloy thereof, or a Sn-based compound, such as $SnO_2$/ bismuth (Bi) or a compound thereof/lead (Pb) or a compound thereof/antimony (Sb) and a compound thereof/zinc (Zn) and a compound thereof/iron (Fe) and a compound thereof/cadmium (Cd) and a compound thereof/and aluminum (Al) a compound thereof. However, the present invention is not limited thereto. For example, the electrically active material may contain nay of other metals, metalloids, and nonmetals, which may intercalate and de-intercalate lithium or alloyed and dealloyed with lithium, or compounds thereof, such as oxides thereof, nitrides thereof, and fluorides thereof. Furthermore, the electrically active material may include sodium suitable for a NaS battery or at least one from among other oxides, carbides, nitrides, sulfides, phosphides, celenides, and tellurides.

According to some embodiments, if an electrically active material is charged into pores of the conductive non-woven fabric sheet 10 in the form of particles, to restrain the charged electrically active material to conductive fibers, a polymer binder, such as polyvinylidenefluoride (PVDF), styrenebutadiene rubber (SBR), polyimide, a polyurethane-based polymer, a polyester-based polymer, and an ethylene-propylenediene copolymer (EPDM) may be added. Furthermore, together with the binder, carbon black, acetylene black, ketjen black, fine carbon like superfine graphite particles, a nano metal particle paste, an indium tin oxide (ITO) paste, carbon nanotubes, or other nano structures with large specific surface areas and low resistances may be added.

Referring back to FIG. 1A, conductive patterns 10P_1 for partially blocking pores may be formed on a surface of a main surface (referred to hereinafter as a 'main surface') of the conductive non-woven fabric sheet 10. The conductive patterns 10P_1 may be formed any one of or both of main surfaces of the conductive non-woven fabric sheet 10.

At a surface of the conductive non-woven fabric sheet 10 having arranged thereon the conductive patterns 10P_1, pores exposed on the surfaces are blocked unlike other adjacent exposed surface portions of the conductive non-woven fabric sheet 10. The blocking of the pores include a case where substantially all pores are completely covered and a case where porosity is reduced to less than or equal to 30%. The surface regions having arranged thereon the conductive patterns 10P_1 may exhibit greater mechanical strength than that of the other exposed surfaces 10E or may increase tensile strength of the entire conductive non-woven fabric sheet. Detailed descriptions thereof will be given below.

According to some embodiments, the conductive patterns 10P_1 may be formed by partially fusing the conductive fibers 10W on the surfaces of the conductive non-woven fabric sheets 10 to one another. The partial fusion may be performed via an ultrasound welding operation, a thermal welding operation, or a soldering operation. According to another embodiment, the conductive patterns 10P_1 may be provided by coating or fusing a conductive layer, such as a metal pattern layer, on a surface of the conductive non-woven fabric sheet 10. The coating may be performed by forming a conductive layer throughout a main surface of the conductive non-woven fabric sheet 10 and patterning the same or laminating a patterned conductive layer onto the conductive non-woven fabric sheet 10.

Other than the portions blocked by the conductive patterns 10P_1, the exposed surfaces 10E may communicate with the interior of the conductive non-woven fabric sheet 10 via exposed pores. An operation for loading an electrically active material to the conductive non-woven fabric sheet 10 may be performed via the pores of the exposed surfaces 10E of the conductive non-woven fabric sheet 10. Here, the conductive non-woven fabric sheet 10 excluding the regions masked by the conductive patterns 10P_1 of the non-woven fabric current collector may be uniformly charged with the electrically active material throughout. The conductive patterns 10P_1 may be exposed by cleaning surfaces of the conductive non-woven fabric sheet 10 charged with the electrically active material after the loading operation is completed. Selectively, the non-woven fabric current collector charged with the electrically active material may experience a pressing operation for controlling density and thickness of an electrode.

The conductive patterns 10P_1 may include linear patterns that are apart from one another at a certain interval to expose pores on a surface of the conductive non-woven fabric sheet 10. As shown in FIG. 1A, the linear patterns may extend across a main surface of the conductive non-woven fabric sheet 10. In this case, the linear patterns may extend to edges of the conductive non-woven fabric sheet 10.

The direction indicated by the arrow x refers to a direction for transferring the non-woven fabric current collector 100 during continuous operations for fabricating an electrode as described below with reference to FIGS. 4 to 7 (a direction P and a direction B), whereas the direction indicated by the arrow y refers to a direction that is parallel to a folding axis or a winding axis I in a packaging operation including an operation for folding or winding a non-woven fabric current collector during packaging of a battery as described above with reference to FIGS. 8A to 8D. The embodiment shown in FIG. 1A exemplifies that the linear patterns are aligned along a direction parallel to the folding axis or the winding axis of the non-woven fabric current collector. However, the linear patterns may be aligned along a direction parallel to the transferring direction of the conductive non-woven fabric sheet 10. Furthermore, although it is described above that the transferring direction of the conductive non-woven fabric sheet 10 is perpendicular to the folding axis or the winding axis of the non-woven fabric current collector, it is merely an example, and the directions may be parallel to each other.

Referring to FIG. 1C, conductive patterns 10P_1' of a non-woven fabric current collector 100" may include a fused portion that extends from a surface of the conductive non-woven fabric sheet 10 to an opposite main surface of the conductive non-woven fabric sheet 10 through the conductive non-woven fabric sheet 10. The fused portion may be provided as conductive fibers are fused with one another in the depth-wise direction of the conductive non-woven fabric sheet 10 during formation of the conductive patterns 10P_1'. The fusion in the depth-wise direction may be accomplished by adjusting variables including energy applied during an ultrasound welding operation, a thermal welding operation, or a soldering operation. As described above, when the conductive fibers 10W are fused with one another in the depth-wise direction of the conductive non-woven fabric sheet 10 below a surface of the conductive non-woven fabric sheet 10, the conductive non-woven fabric sheet 10 may be deformed to a wave-like shape as shown in FIG. 1C.

Figure 2A:
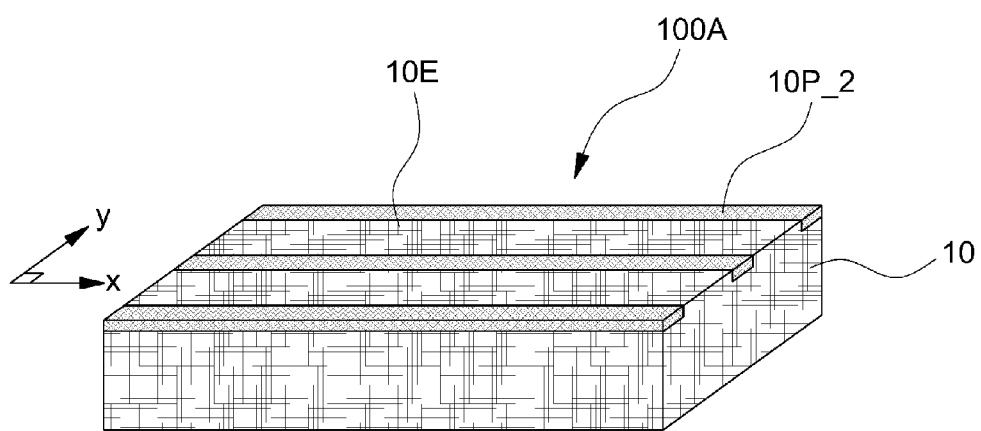
FIGS. 2A and 2B are perspective views of non-woven fabric current collectors, according to other embodiments of the present invention.
Figure 2B:
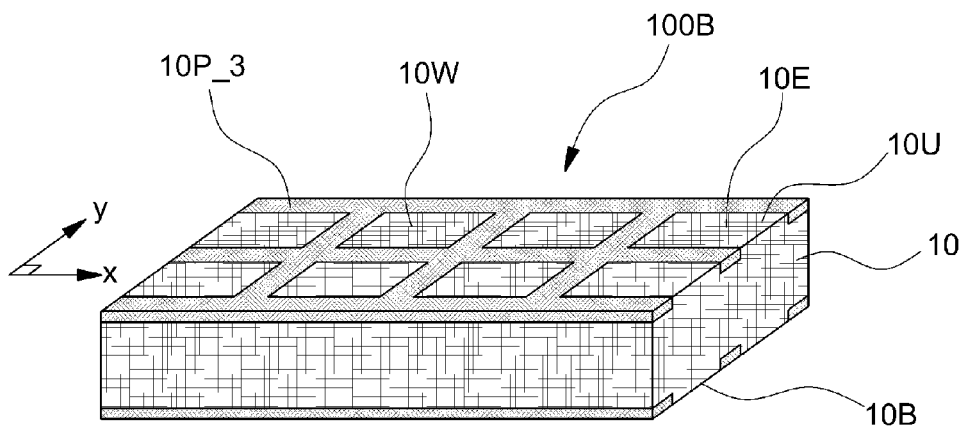

FIGS. 2A and 2B are perspective views of non-woven fabric current collectors 100A and 100B, according to other embodiments of the present invention.

Referring to FIG. 2A, conductive patterns 10P_2 may include linear patterns that are apart from one another at a certain interval to expose pores on a surface of the conductive non-woven fabric sheet 10. The linear patterns may extend across a main surface of the conductive non-woven fabric sheet 10. The linear patterns may be aligned along a direction x that is parallel to the transferring direction of the conductive non-woven fabric sheet 10 as described above. Furthermore, the linear patterns may be formed at edges of the non-woven fabric current collector 100 or may be locally formed only at edges of the non-woven fabric current collector 100.

Referring to FIG. 2B, conductive patterns 10P_3 may include a lattice pattern formed on a main surface of the conductive non-woven fabric sheet 10. The lattice pattern may include a lattice pattern extending in directions respectively indicated by the arrows x and y. According to some embodiments, as shown in FIG. 2B, the lattice patterns may be formed both on a top surface 10U and a bottom surface 10B of the conductive non-woven fabric sheet 10. The characteristics shown in FIG. 2B may be applied to the conductive patterns 10P_1 and 10P_2 described above with reference to FIGS. 1A to 2A. For example, the conductive patterns 10P_1 may be formed on the both main surfaces of the conductive non-woven fabric sheet 10.

The conductive patterns described above may be combined with each other. For example, linear patterns may be formed on the top surface 10U of the conductive non-woven fabric sheet 10, whereas a lattice pattern may be formed on the bottom surface 10B. Furthermore, linear patterns may be formed on the top surface 10U and the bottom surface 10B of the conductive non-woven fabric sheet 10, where the linear patterns may orthogonally extend in directions x and y. Furthermore, as described above with reference to FIG. 1C, the conductive patterns may further extend from a surface of the conductive non-woven fabric sheet 10 in the depth-wise direction of the conductive non-woven fabric sheet 10.

The above-stated conductive patterns improve tensile strength of the conductive non-woven fabric sheet 10 in the direction x or the direction y (the direction in which the conductive patterns extend) or mechanically reinforces the conductive non-woven fabric sheet 10 to reduce deformation or break due to stress concentrated at a particular portion of the conductive non-woven fabric sheet 10 in an operation for folding or winding the conductive non-woven fabric sheet 10 during packaging of a battery. Furthermore, surfaces of the conductive patterns provide clean conductive surfaces without interference of an electrically active material, and thus the conductive patterns may function as leads or tab locations for connection to an external circuit. The characteristics and the advantages will be described below in closer detail with reference to FIG. the attached drawings.

Figure 3A:
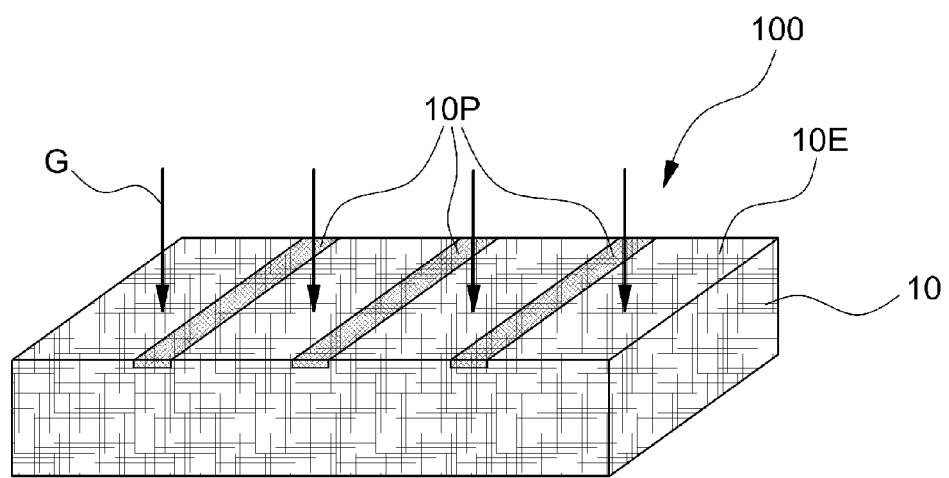
FIGS. 3A and 3B are perspective views sequentially showing a method of fabricating an electrode according to an embodiment of the present invention.
Figure 3B:
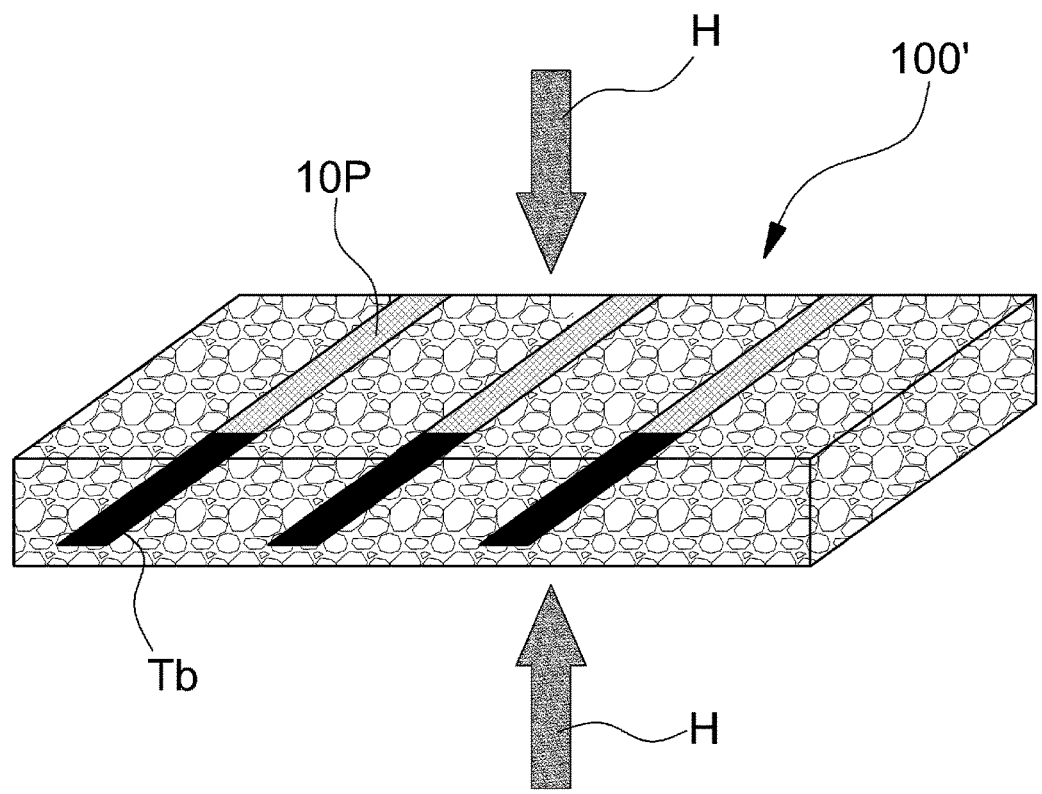

FIGS. 3A and 3B are perspective views sequentially showing a method of fabricating an electrode according to an embodiment of the present invention.

Referring to FIG. 3A, the interior of the conductive non-woven fabric sheet 10 having formed thereon conductive patterns 10P may be filled with an electrically active material. The electrically active material may be loaded into the conductive non-woven fabric sheet 10 in the form of slurries or powders, as indicated by the arrow G. The electrically active material may be loaded by using a suitable injecting device, such as slit die or a spray device (not shown). By using the slit die, the electrically active material is impregnated into the conductive non-woven fabric sheet 10 in the form of slurries or powders via pores of the exposed surfaces 10E of the conductive non-woven fabric sheet 10L. An amount and uniformity of the impregnated electrically active material may be controlled by appropriately adjusting a pressure applied to the injecting device.

The conductive patterns 10P function as a mask with respect to the electrically active material loaded into the conductive non-woven fabric sheet 10. Other than the portions blocked by the conductive patterns 10P, the exposed surfaces 10E may communicate with the interior of the conductive non-woven fabric sheet 10 via exposed pores. As a result, the conductive non-woven fabric sheet 10 excluding the regions masked by the conductive patterns 10P may be uniformly charged with the electrically active material throughout.

Referring to FIG. 3B, after the loading operation is completed, the non-woven fabric current collector 100 charged with an electrically active material may be fabricated. When the electrically active material EA on surfaces of the exposed conductive patterns 10P is removed, clean surfaces of the conductive patterns 10P may be exposed, and the conductive patterns become locations of battery tabs or leads Tb. Since the battery tabs or leads Tb may be soldered or fused to the conductive patterns 10P without being interference by the electrically active material filling the conductive non-woven fabric sheet 10, a low-resistance contact may be substantially provided to a network of conductive fibers inside the conductive non-woven fabric sheet, and thus it becomes easy to form a battery tabs or leads for the non-woven fabric current collector 100'.

In consideration of a battery packaging method like winding or folding, the battery tabs or leads Tb may be formed at edges of the non-woven fabric current collector 100'. In this case, the conductive patterns 10P may extend to edges of the conductive non-woven fabric sheet 10.

Selectively, after the electrically active material is loaded, the conductive non-woven fabric sheet 10 may experience a pressing operation as indicated by the arrow H to control density and thickness of an electrode. The pressing operation may be performed before or after formation of battery tabs or leads Tb. However, the present invention is not limited thereto. Furthermore, the operation for charging the conductive non-woven fabric sheet 10 with an electrically active material may be, as described below, performed by continuously supplying the conductive non-woven fabric sheet 10 by using a suitable winding roll or a suitable transferring device and charging the conductive non-woven fabric sheet 10 with the electrically active material.

Figure 4:
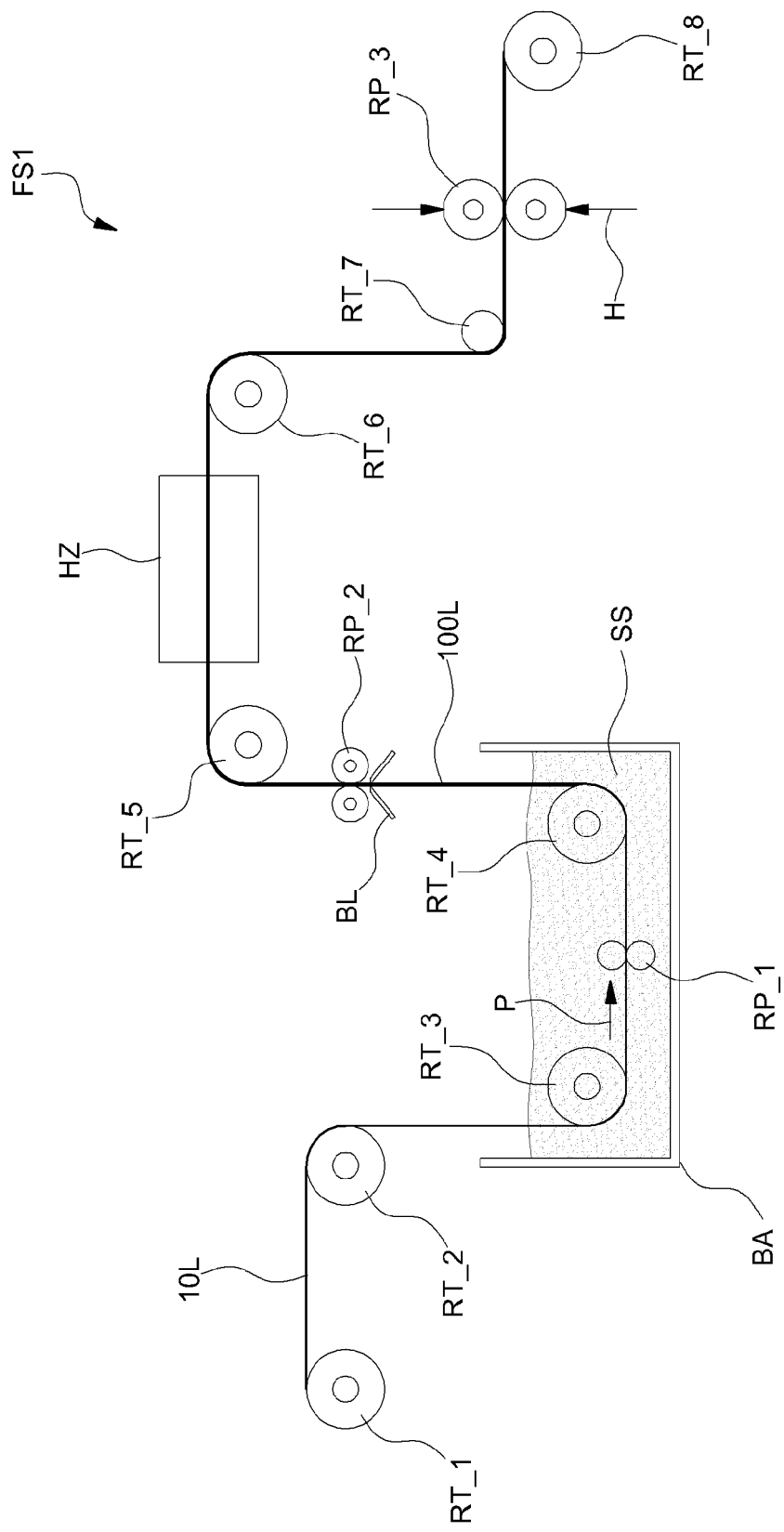
FIG. 4 is a diagram showing an electrode fabricating system according to an embodiment of the present invention.

FIG. 4 is a diagram showing an electrode fabricating system FS1 according to an embodiment of the present invention.

Referring to FIG. 4, the electrode fabricating system FS1 is a device for forming electrodes by charging a continuously provided conductive non-woven fabric sheet 10L. The electrode fabricating system FS1 may include a plurality of roller members RT_1 to RT_8 as a supplying device or a transferring device for continuously supplying the conductive non-woven fabric sheet 10L.

From among the roller members, a first transfer roller RT_1 may be an unwinding device for supplying the conductive non-woven fabric sheet 10L. The conductive non-woven fabric sheet 10L unwound from the unwinding device RT_1 may pass through a second transfer roller RT_2 for changing a transferring direction or maintaining a suitable tensile stress, and then the conductive non-woven fabric sheet 10L may pass through a bath BA having dissolved or dispersed therein an electrically active material SS. The second transfer roller RT_2 is merely an example and may be omitted or replaced or combined with another device known in the art.

The electrically active material SS in the bath BA may be slurries, dry powders, or a liquid with a low viscosity. In case of an electrically active material in the form of a liquid with a low viscosity, the electrically active material SS may be coated onto conductive fibers constituting the conductive non-woven fabric sheet 10L as a coating layer. In the bath BA, a third transfer roller RT_3 and a fourth transfer roller RT_4 for resolving resistance based on friction based on contact between the electrically active material SS and the conductive non-woven fabric sheet 10L having the pores and moving the conductive non-woven fabric sheet 10L in a direction P at a constant speed may be provided. However, the third and fourth transfer rollers RT_3 and RT_4 are merely examples, and other transferring devices known in the art may also be applied.

According to some embodiments, in the bath BA, a supplying device for promoting impregnation of the electrically active material SS into the conductive non-woven fabric sheet 10L via pores at the exposed surface of the conductive non-woven fabric sheet 10L may be provided. As shown in FIG. 4, the supplying device may include first processing rollers RP_1 for applying a constant pressure. The first processing rollers RP_1 are arranged to face each other to define a gap of a constant size and may revolve in directions opposite to each other. As the conductive non-woven fabric sheet 10L passes through the gap, the electrically active material SS is pressed, and thus the electrically active material SS is press-introduced into the conductive non-woven fabric sheet 10L from a surface of the conductive non-woven fabric sheet 10L. Two or more pairs of the first processing rollers RP_1 may be arranged for uniformly charging the electrically active material SS, charging the electrically active material SS at the maximum density, and/or controlling impregnation amount. However, the present invention is not limited thereto.

According to some embodiments, the supplying device, e.g., the first processing rollers RP_1, may have a suitable surface pattern, such as a concavo-convex pattern, for attracting the electrically active material SS in nearby portions to a surface contacting the conductive non-woven fabric sheet 10L. However, as the supplying device, the first processing roller RP_1 described above is merely an example, and the present invention is not limited thereto. For example, the first processing rollers RP_1 may be modified to a bar type device, a flat panel-like device, or a combination thereof for uniformly charging the electrically active material SS, charging the electrically active material SS at the maximum density, and/or controlling impregnation amount. In the operation as described above, an electrically active material permeated via pores of the conductive non-woven fabric sheet 10L may be trapped inside the conductive non-woven fabric sheet 10L, the electrically active material may be efficiently impregnated by using a bath, where it is difficult to perform such an operation for impregnation of an electrically active material based on attraction in a bath at a conventional metal-foil current collector.

When the conductive non-woven fabric sheet 10L is charged with the electrically active material SS and becomes a non-woven fabric current collector 100L, the non-woven fabric current collector 100L is pulled out of the bath BA. A surplus electrically active material may remain on surfaces of the non-woven fabric current collector 100L pulled out of the bath BA. To remove the surplus electrically active material, a sweeping member, such as a blade BL, cleans surfaces of the non-woven fabric current collector 100L, thereby removing the surplus electrically active material and exposing conductive patterns (refer to 10P_1 of FIG. 1) formed on surfaces of the non-woven fabric current collector 100L.

According to some embodiments, guide rolls, such as second processing rollers RP_2, for pressing a constant pressure from outside for adjusting an amount of an electrically active material to be impregnated into the non-woven fabric current collector 100L may be provided. As described above, when an operation for impregnation of an electrically active material is completed, the non-woven fabric current collector 100L is transferred to a later operation. To this end, the electrode fabricating system FS1 may include fifth to seventh roller members RT_1 to RT_8 as transferring unit.

The non-woven fabric current collector 100L charged with an electrically active material may be post-processed by being passed through a drying device like a heater or a heat treatment device HZ. Next, as indicated by an arrow H, the post-processed conductive non-woven fabric sheet may be pressed by third processing rollers RP_3 capable of applying a pressure. Via the pressing operation, thickness of a non-woven fabric electrode and energy density of the non-woven fabric electrode may be controlled via the pressing operation.

A fabricated non-woven fabric electrode may be continuously discharged by the electrode fabricating system FS1 and may be accommodated by a winding device RT_8. The accommodated non-woven fabric electrode may be suitably diced and utilized as a negative electrode or a positive electrode of a battery. According to some embodiments, the fabricated non-woven fabric electrode may not be accommodated and may continuously experience later operations, such as a tab forming operation, an separator stacking operation, an electrolyte impregnating operation, or a stacking operation for packaging, or a jelly roll forming operation.

In case of a non-woven fabric current collector formed of physical attachment of conductive fibers only, due to fibrous characteristics thereof, the non-woven fabric current collector may be elongated by 20% or more due to stress applied to the non-woven fabric current collector in continuous operations based on the above-stated transferring mechanism. In this case, due to change of porosity and increased uniformity in the non-woven fabric current collector, it is substantially impossible to continuously transfer the non-woven fabric current collector and perform continuous operations by using rollers. Furthermore, extreme defects, such as excessive elongation or break, may occur. Even if such extreme defects do not occur, electric contacts between conductive fibers and electric contact between surfaces of the conductive fibers and an electrically active material may be deteriorated, and thus it is demanded to control and suppress an elongation ratio. According to an embodiment of the present invention, since tension of a non-woven fabric current collector may be reinforced by conductive patterns formed on a conductive non-woven fabric sheet, tensile elongation ratio of a non-woven fabric current collector is controlled to be less than or equal to 20% by arranging a tension reinforcing layer and may preferably be controlled to be within a range from about 0.1% to about 10%. Therefore, continuous operations may be performed by using transferring devices, such as rollers, at a same level as the battery fabricating operations using a metal foil current collector in the related art and not only electrochemical characteristics of a non-woven fabric current collector, but also operational advantages may be maximized.

Figure 5:
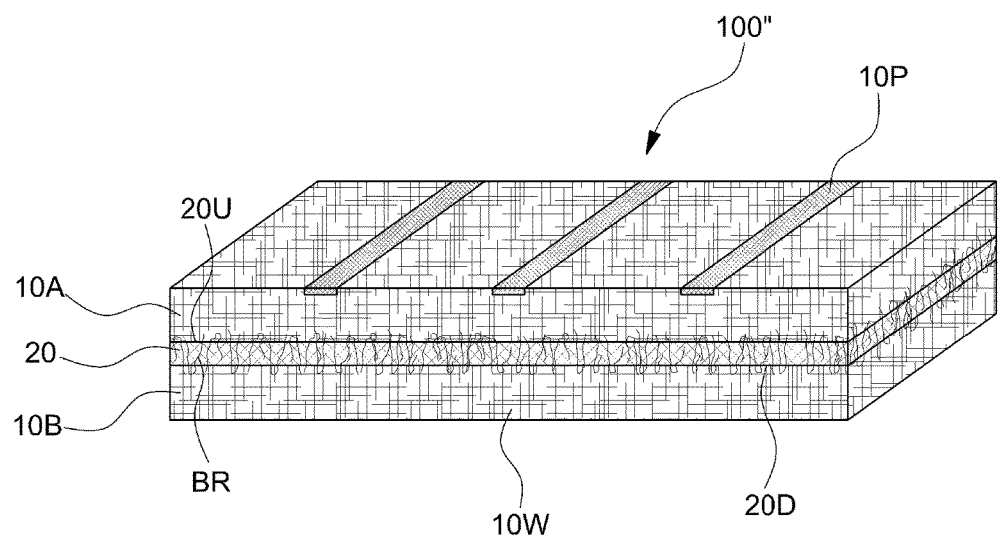
FIG. 5 is perspective view of a non-woven fabric current collector according to an embodiment of the present invention.

FIG. 5 is perspective view of a non-woven fabric current collector 100" according to an embodiment of the present invention.

Referring to FIG. 5, the non-woven fabric current collector 100" may include an upper conductive non-woven fabric sheet 10A and a lower conductive non-woven fabric sheet 10B. The upper conductive non-woven fabric sheet 10A and the lower conductive non-woven fabric sheet 10B may be conductive non-woven fabric sheets (10 of FIG. 1A) as described above. The conductive fibers 10W form a path for transferring electrons and may be used as a current collector. The conductive patterns 10P partially blocking pores may be formed on at least one surface of the upper conductive non-woven fabric sheet 10A and the lower conductive non-woven fabric sheet 10B. The conductive patterns 10P may include a fused portion (refer to 10P_1 of FIG. 1B) formed through or to a partial depth of the upper conductive non-woven fabric sheet 10A and the lower conductive non-woven fabric sheet 10B. The fused portion may be formed in either the upper conductive non-woven fabric sheet 10A or the lower conductive non-woven fabric sheet 10B only.

The tension reinforcing layer 20 may be arranged between the upper conductive non-woven fabric sheet 10A and the lower conductive non-woven fabric sheet 10B. According to another embodiment of the present invention, the non-woven fabric current collector 100" may include a single conductive non-woven fabric sheet, and the tension reinforcing layer 20 may be formed on any one of or both main surfaces of the conductive non-woven fabric sheet. According to another embodiment of the present invention, the non-woven fabric current collector may be a stacked structure in which conductive non-woven fabric sheets combined with tension reinforcing layer are stacked at least twice.

The tension reinforcing layer 20 may improve tensile strength of the entire non-woven fabric current collector 100". The improvement of tensile strength includes improvement of tension in a direction parallel to the main surface of the non-woven fabric current collector 100". The improvement of tensile strength in a direction parallel to the main surface of the non-woven fabric current collector 100" may include improvements of tensile strength of the non-woven fabric current collector 100" in all directions parallel to the main surface of the non-woven fabric current collector 100", that is, in a radial shape.

According to some embodiments, tension reinforcement in a direction parallel to the main surface of the non-woven fabric current collector 100" may be controlled to be applied to only a predetermined direction selected from among directions parallel to the main surface of the non-woven fabric current collector 100". For example, during a roller transferring operation for continuously performing battery fabricating operations, such as slurry impregnation or pressing operation, or a jelly roll electrode forming operation inducing deformation of the non-woven fabric current collector 100", directions of the tension reinforcement may be limited to directions perpendicular to the revolving axis of a roller used in the above-stated operation or the winding axis of a jelly roll. Therefore, during a packaging operation, such as unwinding or winding operation based on revolutions of the roller or formation of a jelly roll, deformation of the non-woven fabric current collector 100" may be suppressed and fracture or yield may be prevented. Alternatively, as described below with reference to FIGS. 8A to 8D, the tension reinforcement may be performed in a direction parallel to a winding axis or a bending axis I.

Although the tension reinforcing layer 20 maintains a clear layer structure inside the non-woven fabric current collector 100" in the embodiment shown in FIG. 5, it is merely for convenience of explanation, and the present invention is not limited thereto. For example, in the actually fabricated non-woven fabric current collector 100", the upper conductive non-woven fabric sheet 10A and the lower conductive non-woven fabric sheet 10B are substantially integrated with each other, and the tension reinforcing layer 20 may be buried inside the same. As a result, the tension reinforcing layer 20 may not be clearly distinguished by the naked eyes. The characteristic may be exhibited in various degrees in embodiments of tension reinforcing layers 20A to 20D described below with reference to FIGS. 5B to 6C.

Adhesion between the upper conductive non-woven fabric sheet 10A and the lower conductive non-woven fabric sheet 10B may be mediated by the tension reinforcing layer 20. According to an embodiment, the upper conductive non-woven fabric sheet 10A and the lower conductive non-woven fabric sheet 10B may be respectively adhered to a top surface 20U and a bottom surface 20D of the tension reinforcing layer 20, and thus the upper conductive non-woven fabric sheet 10A and the lower conductive non-woven fabric sheet 10B may be combined with each other. According to an embodiment, for such a combination, the tension reinforcing layer 20 may include a combining material or a separate combining material may be employed.

According to another embodiment, the combination between the tension reinforcing layer 20 and the conductive non-woven fabric sheets 10A and 10B may be accomplished as the tension reinforcing layer 20 or the conductive non-woven fabric sheets 10A and 10B is/are partially melted by energy, such as heat, an infrared ray, a ultraviolet ray, an electron beam, or a ultrasound wave, and adhered to each other or both tension reinforcing layer 20 and the conductive non-woven fabric sheets 10A and 10B is/are partially melted and adhered to each other. Since no combining material is employed in the operation, environmental burden may be reduced.

According to another embodiment, the upper conductive non-woven fabric sheet 10A and the lower conductive non-woven fabric sheet 10B may be combined with each other by being bridged to each other via the tension reinforcing layer 20 based on fibrous characteristics thereof. As shown in FIG. 1B, conductive fibers constituting the upper conductive non-woven fabric sheet 10A and/or the lower conductive non-woven fabric sheet 10B may form a bridge BR via the tension reinforcing layer 20, and thus the upper conductive non-woven fabric sheet 10A and the lower conductive non-woven fabric sheet 10B may be mechanically combined and integrated with each other. According to embodiments, since the upper conductive non-woven fabric sheet 10A and the lower conductive non-woven fabric sheet 10B that are combined with each other via the tension reinforcing layer 20 contact and are connected to each other via the bridge BR, the upper conductive non-woven fabric sheet 10A and the lower conductive non-woven fabric sheet 10B are also electrically connected to each other, and thus the non-woven fabric current collector 100 may provide a current collector for a battery or a single conductive network for transferring electrons. Even if a single conductive non-woven fabric sheet is combined with a tension reinforcing layer, the bridge BR may also be formed via a bridge forming operation as described below.

The bridge BR may be formed via a mechanical adhesion using a needle punching method, a spun lacing method, a stitch bonding method, or any of other suitable method. The needle punching method is a method of bridging the conductive fibers 10W of the upper conductive non-woven fabric sheet and the lower conductive non-woven fabric sheet by repeatedly and vertically inserting a large number of needles with hooks into the conductive non-woven fabric sheets and pulling the needles out of the conductive non-woven fabric sheets, where a velour type non-woven fabric may be fabricated by suitably designing shapes of the needles. The spun lacing method is a method of bridging the conductive non-woven fabric sheets of the upper conductive non-woven fabric sheet and the lower conductive non-woven fabric sheet by using high-velocity water jets instead of needles and is also referred to as a water-jet bridging method. The stitch bonding method is a method of sewing along the non-woven fabric current collector.

In the non-woven fabric current collector 100 according to the previous embodiments, the conductive fibers 10W are bridged and integrated with one another, and thus a product with sufficiently large porosity, flexibility, and sufficient softness may be fabricated by reducing an amount of the conductive fibers 10W. According to an embodiment, sufficient mechanical strength of an entire non-woven fabric current collector may be secured based on conductive patterns and a tension reinforcing layer even if an amount of the conductive fibers 10W is reduced for increased porosity, and thus porosity of the non-woven fabric current collector may be easily controlled.

Furthermore, since conductive fibers of the conductive non-woven fabric sheets form a physical contact and tensile strength is improved only in directions parallel to the main surface of the non-woven fabric current collector, contractions and expansions in directions perpendicular to upper and lower surfaces of the non-woven fabric current collector or an internal volume change within a limited volume of the non-woven fabric current collector may be easily absorbed, and thus a possible change of volume of an electrode during charging/discharging operations may be flexibly dealt with. Therefore, irreversibility like a crack of an electrode may be reduced during charging/discharging of a battery, and thus life expectancy of a battery may be improved.

FIGS. 6A to 6D are perspective views of tension reinforcing layers 20A, 20B, 20C, and 20D according to embodiments.

Figure 6A:
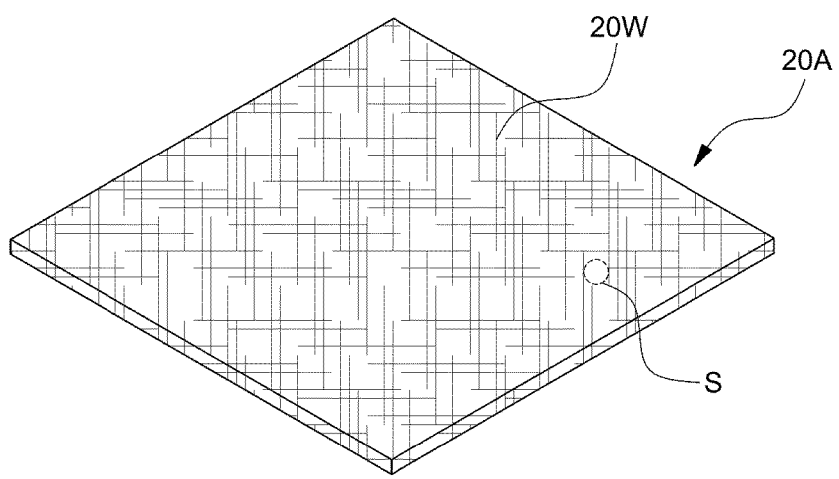
FIGS. 6A to 6D are perspective views of tension reinforcing layers according to various embodiments of the present invention.
Figure 6B:
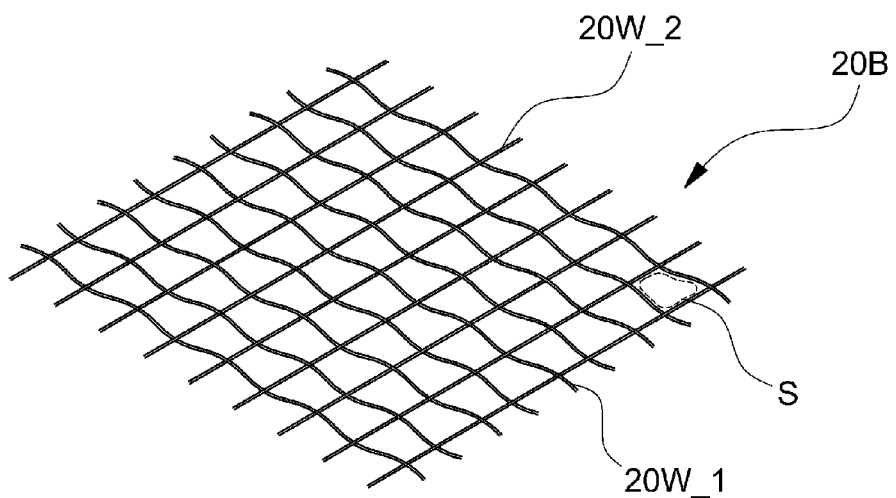

The tension reinforcing layer 20A of FIG. 6A may have a non-woven fabric structure formed of a plurality of plurality of fibers 20W. Since the non-woven fabric structure of the tension reinforcing layer 20A includes the plurality of fibers thermally fused with one another or has a foam structure, tension of the tension reinforcing layer 20A is stronger than that of the non-woven fabric sheets 10A and 10B, and thus the tension reinforcing layer 20A is distinguished from the non-woven fabric sheets 10A and 10B The tension reinforcing layer 20B of FIG. 6B has a woven structure in which a plurality of fibers are woven as latitudinal fibers 20W_1 and longitudinal fibers 20W_2. The woven structure is a merely example plain-woven structure. According to embodiments, the tension reinforcing layer 20B may have another woven structure, such as a twilled structure and a satin-woven structure, or may further have a suitable structure for selectively improving tensile strength in a certain direction.

Figure 6C:
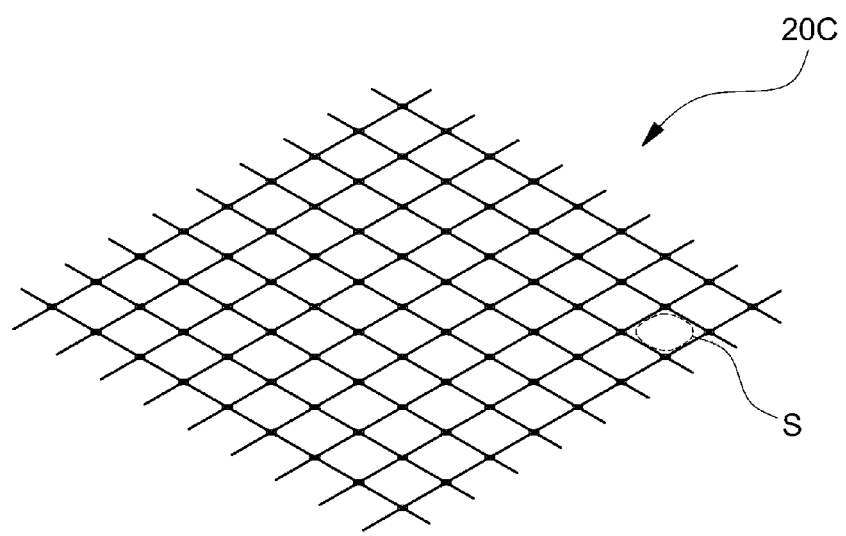
Figure 6D:
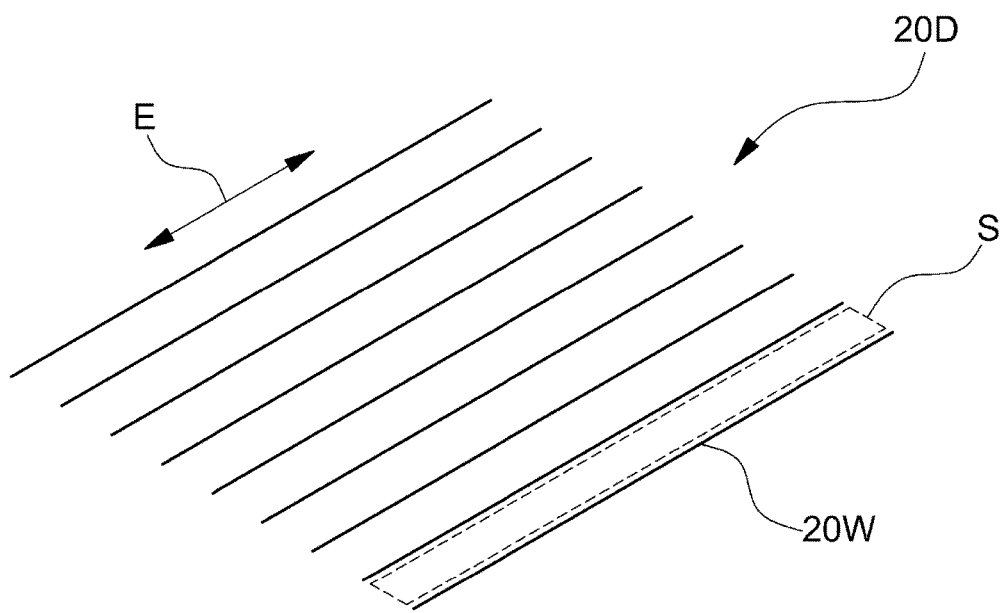

According to another embodiment, the tension reinforcing layer 20C may have a mesh structure 20M as shown in FIG. 6C. According to another embodiment, the tension reinforcing layer 20D may include the plurality of plurality of fibers 20W that extend in a certain direction with gaps S therebetween, as shown in FIG. 6D. The direction (arrow E) that the plurality of fibers 20W extend may be a direction perpendicular to revolving axes of rollers (RT_1 and RT_2 of FIG. 4) that are used for a rolling operation or a jelly roll forming operation for a packaging operation that are demanded in battery fabricating operations, such as a slurry impregnating operation or a pressing operation (e.g., the direction indicated by the arrow B of FIG. 8A).

According to another embodiment, a tension reinforcing layer may have the non-woven fabric structure, the plain-woven structure, or the mesh structure as described above or a combination of two or more structures from among structures in which fibers extend in certain directions. For example, to increase tensile strength of a non-woven fabric current collector in a direction perpendicular to the revolving axis of a roller employed in battery fabricating operations, a modified tension reinforcing layer may have a structure in which the non-woven fabric as shown in FIG. 6A is blended with the structure as shown in FIG. 6D including a plurality of fibers extending in a direction perpendicular to the revolving axis of the roller.

The tension reinforcing layers 20A to 20D includes pores (S). The pores S may be provided by the plurality of conductive fibers 10W or meshes (S of FIG. 2C) that are adjacent to one another and constitute the tension reinforcing layers 20A to 20D. The upper conductive non-woven fabric sheet and the lower conductive non-woven fabric sheet communicate with each other via the pores S. Therefore, for example, the conductive wires low may be bridged to combine the upper conductive non-woven fabric sheet and the lower conductive non-woven fabric sheet to each other via the pores S of the tension reinforcing layers 20A to 20D. Furthermore, ions for a battery reaction may be smoothly transferred inside the non-woven fabric current collector 100 via the pores S of the tension reinforcing layers 20A to 20D, and a current flow may be secured.

According to some embodiments, an average size of the pores S of the tension reinforcing layers 20A to 20D may be equal to or greater than an average size of pores of the conductive non-woven fabric sheets 10A and 10B having a non-woven fabric structure. If electrically active material particles are impregnated into the entire non-woven fabric current collector 100 for fabrication of an electrode and the pores S of the tension reinforcing layers 20A to 20D are sufficiently large, an electrically active material loaded onto a surface of the upper conductive non-woven fabric sheet or the lower conductive non-woven fabric sheet is not interfered by a tension reinforcing layer and may be uniformly impregnated throughout the non-woven fabric current collector.

The tension reinforcing layers 20A to 20D may contain a polymer material, a metal, or a combination thereof. A material constituting the tension reinforcing layers 20A to 20D may be identical to the material constituting the non-woven fabric current collector or may include materials different therefrom. For example, the polymer material may include a polymer material advantages for fiberization. For example, polyethylene (PE), polypropylene (PP), polyethylene terephthalate (PET), polypropylene terephthalate (PPT), polyacrylonitryl (PAN), nylon, polyethylene naphthalate (PEN), polyether sulfone (PES), polyether etherketone (PEEK), polyphenylene sulfide (PPS), polyvinyliden fluoride (PVDF), a copolymer thereof, a derivative thereof, or a mixture thereof may be used as a polymer material for forming the tension reinforcing layer. However, the above-stated materials are merely examples, and the present invention is not limited thereto. The tension reinforcing layer may also contain a functional polymer material with suitable mechanical properties or a heat-resistance, such as highly strong, highly elastic, and magnetic contractive fiber. Furthermore, if necessary, the binder may be another conductive polymer-based material, petroleum pitch, or coal tar. However, the present invention is not limited to the above-stated materials, and any of various materials that is not dissolved by an electrode and exhibits certain binding force and stability in an electrochemical reaction may be applied thereto. The metals may include copper, aluminum, a stainless steel, nickel, or an alloy thereof.

Figure 7:
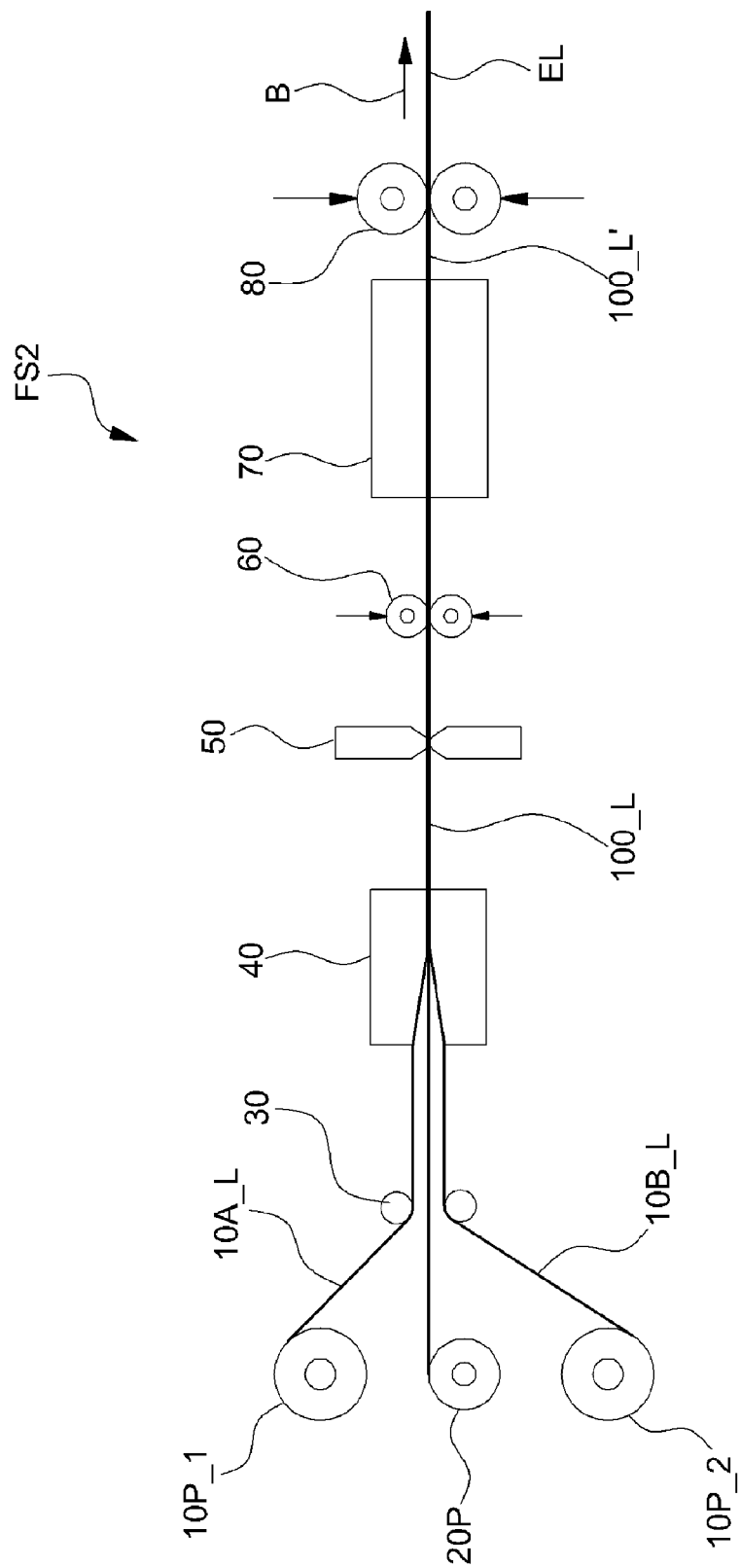
FIG. 7 is a diagram showing an electrode fabricating system FS2 according to an embodiment of the present invention.

FIG. 7 is a diagram showing an electrode fabricating system FS2 according to an embodiment of the present invention.

Referring to FIG. 7, to fabricate an electrode, an operation for providing an upper conductive non-woven fabric sheet, an operation for providing a lower conductive non-woven fabric sheet, and an operation for providing a tension reinforcing layer are independently performed. Next, an operation for combining the upper conductive non-woven fabric sheet and the lower conductive non-woven fabric sheet with each other via the tension reinforcing layer is performed. The operations may be continuously performed.

For continuous operations, an upper conductive non-woven fabric sheet 10A_L and a lower conductive non-woven fabric sheet 10B_L may be provided by a first unwinding device 10P_1 and a second unwinding device 10P_2, respectively. Furthermore, a tension reinforcing layer 20_L may also be provided by a third unwinding device 20P. To arranged the tension reinforcing layer 20_L between the upper conductive non-woven fabric sheet 10A_L and the lower conductive non-woven fabric sheet 10B_L, the first to third unwinding devices 10P_1, 10P_2, and 20P may be arranged in an order identical to the order that the upper conductive non-woven fabric sheet 10A_L, the tension reinforcing layer 20_L, and the lower conductive non-woven fabric sheet 10B_L are stacked.

According to some embodiments, aligning members for aligning the conductive non-woven fabric sheets 10A_L and 10B_L and the tension reinforcing layer 20_L unwound from the first to third unwinding devices 10P_1, 10P_2, and 20P in parallel to one another to be suitably stacked, where the aligning members may be roller members 30. According to another embodiment, the roller members 30 may be provided with or replaced with a guiding member, such as a blade.

The conductive non-woven fabric sheets 10A_L and 10B_L and the tension reinforcing layer 20_L that are arranged in parallel with one another are combined with one another via a combining device 40. The combining device 40 may be a heater or a device for applying energy, such as heat, an infrared ray, an ultraviolet ray, an electron beam, or an ultrasound wave, for melted adhesion, according to types of the tension reinforcing layer 20_L. According to another embodiment, the combining device 40 may be a fiber combining device, such as a needle punching device, a spun lacing device, or a stitch bonding device for bridging the upper conductive non-woven fabric sheet 10A_L and the lower conductive non-woven fabric sheet 10B_L with each other.

A non-woven fabric current collector 100_L fabricated by the combining device 40 exhibits tensile stress reinforced by the conductive patterns on surfaces of the non-woven fabric current collector 100_L the tension reinforcing layer. The fabricated non-woven fabric current collector 100_L may be accommodated by a separate winding device (not shown). According to some embodiments, before the non-woven fabric current collector 100_L is accommodated by the winding device, the non-woven fabric current collector 100_L may be pressed by a pressing device, such as a pressing roller member, or may experience a refining operation for removing moisture or foreign substances by being transferred via a drying device, such as a heating device. The fabricated non-woven fabric current collector 100_L may experience an operation for charging an electrically active material, an operation for post-processing the electrically active material, and an operation for pressing an electrode.

According to another embodiment of the present invention, as in operations after the combining device 40 as shown in FIG. 7, the non-woven fabric current collector 100_L may not be accommodated by the winding device and a charging operation for charging an electrically active material for forming a positive electrode or a negative electrode may be continuously performed. As described above with reference to FIG. 3A, the operation for charging the electrically active material may be an operation for loading the electrically active material in the form of slurries or powders. The electrically active material is impregnated by a slit die 50 into the non-woven fabric current collector 100_L in the form of slurries or powders via pores exposed on a surface of the non-woven fabric current collector 100_L. An amount and uniformity of the impregnated electrically active material may be controlled by appropriately adjusting a pressure applied to the slit die 50. According to another embodiment of the present invention, the operation for loading an electrically active material may be performed by using a spray.

Conductive patterns formed on surfaces of a conductive non-woven fabric sheet function as a mask against an electrically active material loaded thereto. According to some embodiments, to control an impregnated amount of the electrically active material, a guide roll capable of applying a constant pressure may be provided. According to another embodiment, an impregnated amount of the electrically active material may be controlled by sweeping a surface of a non-woven fabric current collector by using a blade or a bar.

According to some embodiments, the electrically active material may be coated onto conductive fibers of the non-woven fabric current collector 100_L. To coat the electrically active material onto conductive fibers, a plating bath for electrolyte plating or electrolyteless plating may be provided. As the non-woven fabric current collector 100_L passes through an electrolyte or a metal ion solution in the plating bath, the electrically active material may be coated onto the conductive fibers, accompanied with reduction or extraction of metal ions. According to some embodiments, the electrically active material may be physically vapor-deposited onto the conductive fibers of the non-woven fabric current collector 100_L by using a sputtering method or an electron beam evaporation method or may be chemically vapor-deposited by using a suitable vapor precursor. To this end, a suitable atmospheric or vacuum chamber may be provided. The above-stated systems for forming the electrically active material may be used in combinations.

A non-woven fabric current collector 100_L' charged with an electrically active material may be post-processed by being passed through a drying device or a heat treating device 70, such as a heater. Next, as indicated by the arrow, the post-processed non-woven fabric current collector 100_L' is pressed by a roller member 80 capable of applying a pressure thereto, and thus thickness and electrode density of the non-woven fabric current collector 100_L' may be controlled.

A fabricated non-woven fabric electrode EL may be continuously discharged by a fabrication system 200 as indicated by the arrow B and may be accommodated by a winding device (not shown). The accommodated non-woven fabric electrode EL may be suitably cut and used for packaging batteries. According to some embodiments, the fabricated non-woven fabric electrode EL may not be accommodated and may continuously experience later operations, such as a tab forming operation, an separator stacking operation, an electrolyte impregnating operation, or a stacking operation for packaging, or a jelly roll forming operation.

Due to conductive patterns and/or a tension reinforcing layer, a tensile elongation ratio may be limited to below or equal to 20% despite of stresses applied in continuous operations employing the above-stated first to third unwinding devices 10P_1, 10P_2, 20P, and 30. In this case, it becomes substantially possible to perform operations based on continuous transfer of the non-woven fabric current collector by using a roller. Furthermore, even if an extreme defect like break does not occur and the non-woven fabric current collector is elongated to a certain degree, electric contacts between conductive fibers and an electric contact between surfaces of the conductive fibers and an electrically active material may be prevented from being deteriorated. According to an embodiment, tensile elongation ratio of a non-woven fabric current collector is controlled to be less than or equal to 20% by arranging a tension reinforcing layer and may preferably be controlled to be within a range from about 0.1% to about 10%. Therefore, battery fabricating operations are performed at a same level as the battery fabricating operations using a metal foil current collector in the related art and operational advantages of a non-woven fabric current collector may be maximized.

FIGS. 8A to 8D are perspective views of electrode assemblies for a battery employing non-woven fabric current collectors according to various embodiments of the present invention.

Figure 8A:
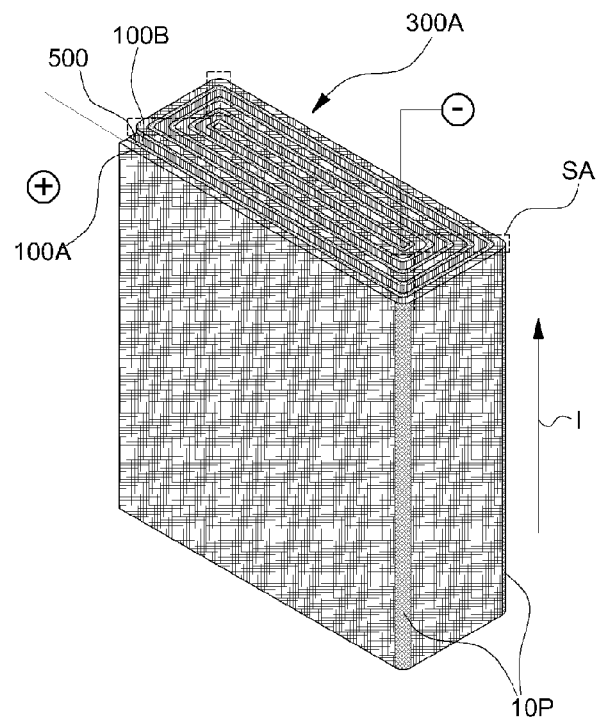
FIGS. 8A to 8D are perspective views of electrode assemblies for a battery employing non-woven fabric current collectors according to various embodiments of the present invention.

Referring to FIG. 8A, an electrode assembly includes a stacked electrode structure 300A including an electrode 100A from between a negative electrode and a positive electrode, the other electrode 100B from between the negative electrode and the positive electrode, and a separator 500 for electric separation therebetween. For example, the electrode 100A may be a positive electrode and the electrode 100B may be a negative electrode. At least one of the electrodes 100A and 100B may be a non-woven fabric current collector charged with a corresponding electrically active material.

As shown in FIG. 8A, the stacked electrode structure 300A including the non-woven fabric current collector may be configured by hexahedrally wound around a direction parallel to the winding axis I as the center axis. Since corner regions SA are significantly deformed during hexahedral winding, the conductive patterns 10P including linear patterns extending in a direction parallel to the winding axis I are formed at the corner regions SA to resist stresses concentrated to the corner regions SA, thereby preventing deterioration of a battery due to excessive deformation.

Figure 8B:
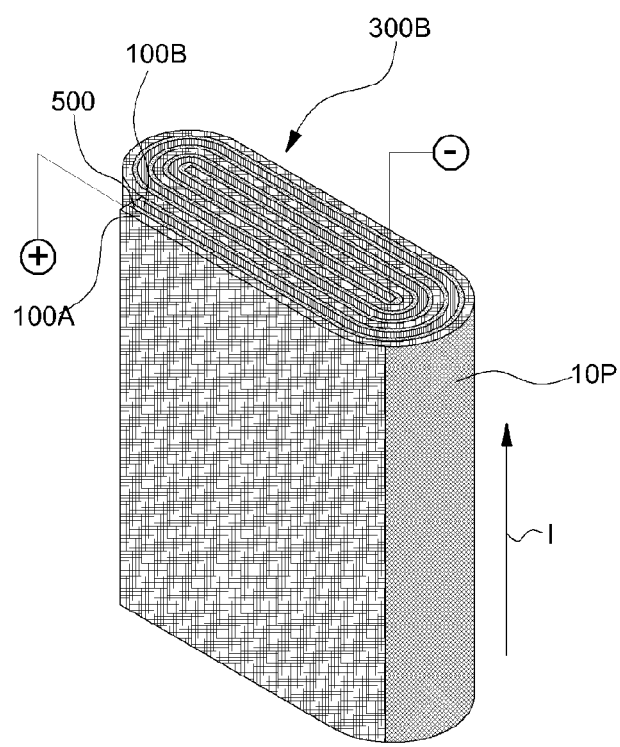

Referring to FIG. 8B, a stacked electrode structure 300B including a non-woven fabric current collector may have a curvedly wound configuration. By forming the conductive patterns 10P parallel to the winding axis I, mechanical characteristics of the electrode including the non-woven fabric current collector may be reinforced against deformations during packaging or charging/discharging of a battery.

Figure 8C:
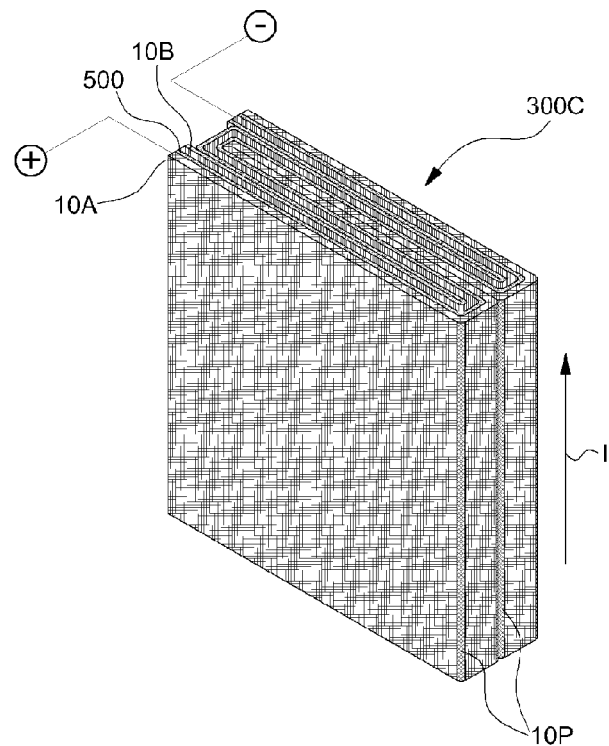
Figure 8D:
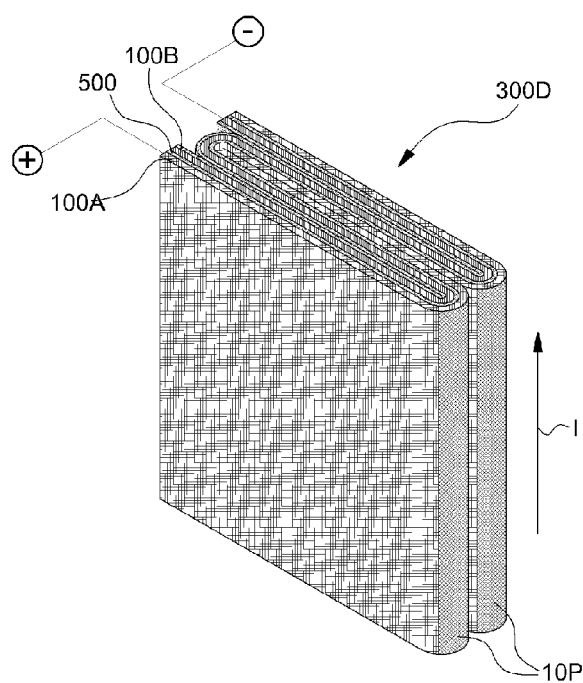

As shown in FIGS. 8C and 8D, stacked electrode structure 300C and 300D may have a folded or bent configuration. By forming the conductive patterns 10P at portions to which stresses are concentrated by folding or bending the structure, mechanical characteristics of the electrode including the non-woven fabric current collector may be reinforced against deformations during packaging or charging/discharging of a battery.

The wound, folded, or bent structure of the stacked electrode structures are merely examples, and the present invention is not limited thereto. A stacked electrode structure may be wound, bent, and stacked in various ways by using flexibility of a conductive non-woven fabric sheet for miniaturization, where mechanical characteristics and life expectancy thereof may be improved by locally forming the conductive patterns 10P at portions at which stresses are applied by a corresponding electrode packaging method.

Figure 9:
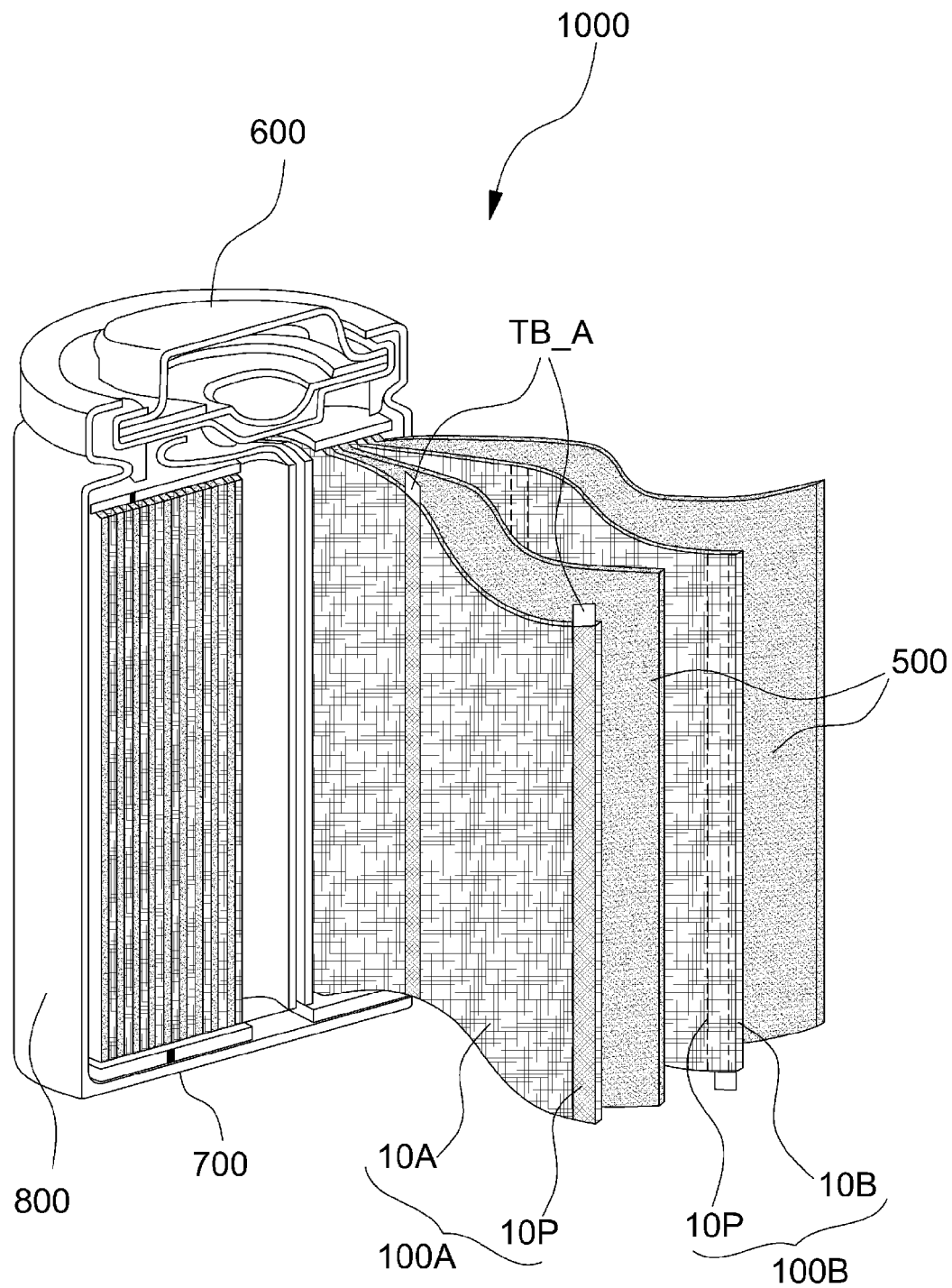
FIG. 9 an exploded perspective view of a battery including an electrode employing a non-woven fabric current collector according to an embodiment of the present invention.

FIG. 9 is an exploded perspective view of a battery 1000 including electrodes 100A and 100B employing non-woven fabric current collectors according to an embodiment of the present invention.

Referring to FIG. 9, the battery 1000 may be a cylindrical battery. An electrode assembly may have a jelly roll structure formed by stacking the positive electrode 100A and the negative electrode 100B employing non-woven fabric current collectors around the separator 500 and winding the positive electrode 100A and the negative electrode 100B. However, it is merely an example, and only one of a positive electrode and a negative electrode may be configured using a non-woven fabric current collector. Furthermore, the battery 1000 may also be fabricated as a coin-type battery, a hexahedral battery, or a flexible battery of any of various shapes using fibers.

As described above, the non-woven fabric current collector may include the conductive non-woven fabric sheets 10A and 10B and the conductive patterns 10P formed on main surfaces thereof. Although not shown, as described above with reference to FIG. 5, the non-woven fabric current collector may include a tension reinforcing layer. An electrically active material may be trapped inside the non-woven fabric sheets 10A and 10B in the form of particles or may be coated onto conductive fibers of the non-woven fabric current collector.

Tabs or leads Tb_A and Tb_B may be formed on side surfaces of the positive electrdoe 100A and the negative electrode 100B. Numbers of the tabs or leads Tb_A and Tb_B may be suitably determined to reduce internal resistance. The battery tabs or leads Tb may be electrically connected onto the conductive patterns of the non-woven fabric current collector by being fused or soldered thereto. The tabs or leads Tb_A and Tb_B may be connected to a positive electrode 600 and a negative electrode 700 of the battery 1000 inside a housing 800, respectively.

The separator 500 between the positive electrode 100A and the negative electrode 100B may be a polymer-based micro-porous film, a woven fabric, a non-woven fabric, a ceramic, an intrinsic solid polymer electrolyte film a gel solid polymer electrolyte film, or a combination thereof. The intrinsic polymer electrolyte film may contain a straight-chain polymer material, or a bridge polymer material, for example. The gel solid polymer electrolyte film may be a plasticizer-containing polymer, a filler-containing polymer, a pure polymer, or a combination thereof. The solid electrolyte film may contain a polymer matrix, an additive, and an electrolyte consisting of any one from among polyethylene, polypropylene, polyimide, polysulfone, polyurethane, polyvinyl chloride, polystyrene, polyethylene oxide, polypropylene oxide, polybutadiene, cellulose, carboxymethyl cellulose, nylon, polyacrylonitrile, polyvinylidene fluoride, poly tetrafluoroethylene, a copolymer of vinylidene fluoride and hexafluoropropylene propylene, a copolymer of vinylidene fluoride and trifluoroethylene, a copolymer of vinylidene fluoride and tetrafluoroethylene, poly(methyl acrylate), poly acrylate, polyethyl acrylate, polymethyl methacrylate, polyethyl methacrylate, polybutyl acrylate, polybutyl methacrylate, polyvinyl acetate, and polyvinyl alcohol or a combination thereof, for example. However, the above-stated materials for forming the separator 500 are merely examples, and any material that is easily deformed, features excellent mechanical strength, is not torn or cracked by deformations of the electrodes 100A and 100B and features an arbitrary suitable electron insulation and excellent ion conductivity may be selected for the separator 500.

The separator 500 may be a single-layer film or a multi-layered film, where the multilayered film may be a stacked structure of same single layer films or a stacked structure of single layer films formed of different materials. For example, the stacked structure may have a structure including a ceramic coating layer formed on a surface of a polymer electrode film, such as a polyolefin film. In consideration of durability, shutdown function, and safety of a battery, thickness of the separator 500 may be from about 10 to about 300, may preferably be from about 10 to about 40, and more preferably, may be from about 10 to about 25.

In a housing 800, a suitable aqueous electrolyte containing a salt, such as potassium hydroxide (KOH), potassium bromide (KBr), potassium chloride (KCL), zinc chloride ($ZnCl_2$), and sulfuric acid $H_2SO_4$ may be absorbed to the electrode structures 100a and 100b and/or the separator 500, thereby completing the battery 1000. According to another embodiment, the battery 1000 may be a non-aqueous electrolyte, such as ethylene carbonate, propylene carbonate, dimethyl carbonate, or diethyl carbonate containing a lithium salt, such as $LiClO_4$ or $LiPF_6$. However, the present invention is not limited thereto. Furthermore, although not shown, a suitable cooling device or a battery managing system for controlling stability and/or power supply characteristics while the battery 1000 is being used may be further attached to the battery 1000.

Due to fibrous characteristics thereof, an electrode employing the non-woven fabric current collector may be easily deformed. Furthermore, since an electrically active material and a conductive network are substantially uniformly mixed throughout the entire volume of an electrode structure, even if thickness of an electrode is increased for adjusting capacity of a battery, deterioration of battery performance, which occurs in a conventional battery structure obtained by coating an active material layer on a metal foil, does not occur. Therefore, an electrode may have any of various volumes.

Furthermore, due to easy deformability of a fabric electrode structure, an electrode may not only be fabricated as a jelly roll type, but also be 3-dimensionally arranged by being bent, and wound and may not only be a cylindrical battery as described above, but also be a hexahedral battery, a pouch-type battery, or one of batteries having various volumes and shapes integrated to a fabric product like a cloth or a bag, where the electrode may be mechanically reinforced to be highly durable against deformation by conductive patterns and may be highly adaptive to fabricating operations based on continuous transfer.

Furthermore, it should be understood that the above-stated electrode structures may be applied to a cathode, an anode, or both of the same in a single battery. The above-stated non-woven fabric current collectors may be applied not only to a lithium ion battery, but also to a lithium metal battery, a lithium air battery, a nickel hydride battery, or a NaS battery. However, it is merely an example, and one of ordinary skill in the art will understand that the present invention is not limited thereto.

While the present invention has been particularly shown and described with reference to embodiments thereof, it will be understood by those of ordinary skill in the art that various changes in form and details may be made therein without departing from the spirit and scope of the present invention as defined by the following claims.

The invention claimed is:

1. An electrode comprising:
a conductive non-woven fabric sheet which is wound, folded, or bent on itself along a winding, folding, or bending axis to form an electrode package structure, the non-woven fabric sheet, comprising:
a main surface;
an interior formed under the main surface;
a network of conductive fibers;
pores for communicating between the main surface and the interior;
an upper conductive non-woven fabric sheet;
a lower conductive non-woven fabric sheet facing the upper conductive non-woven fabric sheet; and
a tension reinforcing layer arranged between the upper conductive non-woven fabric sheet and the lower conductive non-woven fabric sheet; and
conductive patterns formed on the main surface and extending parallel to the winding, folding, or bending axis so that the conductive non-woven fabric sheet is mechanically reinforced to reduce deformation or break due to stress, the conductive patterns at least partially blocking the pores on the main surface of the conductive non-woven fabric sheet,
wherein the conductive patterns are arranged at corner regions of the electrode package structure at which stresses are concentrated, and
wherein the upper conductive non-woven fabric sheet and the lower conductive non-woven fabric sheet are combined with one another by being bridged to one another via the tension reinforcing layer.

2. The electrode of claim 1, wherein the conductive patterns are parallel to a direction in which the non-woven fabric sheet is transferred for forming an electrode.

3. The electrode of claim 1, wherein the conductive patterns comprise linear patterns that are apart from one another at a certain interval.

4. The electrode of claim 3, wherein the linear patterns extend across the main surface of the conductive non-woven fabric sheet.

5. The electrode of claim 1, wherein the conductive patterns extend onto edges of the conductive non-woven fabric sheet.

6. The electrode of claim 1, wherein the conductive patterns are provided via partial fusion of the conductive fibers on the main surface.

7. The electrode of claim 6, wherein the conductive patterns further include a fused portion extending from the main surface in the depth-wise direction of the conductive fibers.

8. The electrode of claim 1, wherein the conductive patterns are provided by a conductive layer formed on the main surface.

9. The electrode of claim 8, wherein the conductive layer comprises a conductive polymer layer.

10. The electrode of claim 1, wherein battery tabs or leads are combined onto at least some of the conductive patterns.

11. The electrode of claim 1, wherein the conductive patterns comprise carbon fibers, conductive polymer fibers, polymer fibers coated with a metal layer or a conductive polymer layer, or hollow metal fibers.

12. The electrode of claim 1, further comprising an electrically active material coated onto the conductive fibers, a particle-type electrically active material between the conductive fibers, or a combination thereof.

13. An electrode, comprising:
a conductive non-woven fabric sheet which is wound, folded, or bent on itself along a winding, folding, or bending axis to form an electrode package structure, the non-woven fabric sheet, comprising:
a main surface;
an interior formed under the main surface;
a network of conductive fibers;
pores for communicating between the main surface and the interior;
an upper conductive non-woven fabric sheet;
a lower conductive non-woven fabric sheet facing the upper conductive non-woven fabric sheet; and
a tension reinforcing layer arranged between the upper conductive non-woven fabric sheet and the lower conductive non-woven fabric sheet; and
conductive patterns formed on the main surface and extending parallel to the winding, folding, or bending axis so that the conductive non-woven fabric sheet is mechanically reinforced to reduce deformation or break due to stress, the conductive patterns at least partially blocking the pores on the main surface of the conductive non-woven fabric sheet,
wherein the conductive patterns are arranged at corner regions of the electrode package structure at which stresses are concentrated,
wherein the conductive patterns include combinations of the conductive fibers which are formed by partially fusing the conductive fibers to each other, and
wherein the upper conductive non-woven fabric sheet and the lower conductive non-woven fabric sheet are combined with one another by being bridged to one another via the tension reinforcing layer.

* * * * *